US010168413B2

(12) United States Patent
Annamalai et al.

(10) Patent No.: US 10,168,413 B2
(45) Date of Patent: Jan. 1, 2019

(54) SERVICE ENHANCEMENTS USING NEAR FIELD COMMUNICATION

(75) Inventors: Magesh Annamalai, Renton, WA (US); Zhengyi Jin, Bellevue, WA (US); Shreenivas M. Shirekar, Irvine, CA (US)

(73) Assignee: T-Mobile USA, Inc., Bellevue, WA (US)

(*) Notice: Subject to any disclaimer, the term of this patent is extended or adjusted under 35 U.S.C. 154(b) by 956 days.

(21) Appl. No.: 13/427,365

(22) Filed: Mar. 22, 2012

(65) Prior Publication Data
US 2012/0246074 A1 Sep. 27, 2012

Related U.S. Application Data

(60) Provisional application No. 61/467,639, filed on Mar. 25, 2011.

(51) Int. Cl.
| | |
|---|---|
| *G01S 5/02* | (2010.01) |
| *G01S 1/68* | (2006.01) |
| *H04W 64/00* | (2009.01) |
| *G06Q 20/32* | (2012.01) |
| *H04B 5/00* | (2006.01) |
| *H04W 4/02* | (2018.01) |

(Continued)

(52) U.S. Cl.
CPC ............ *G01S 5/02* (2013.01); *G01S 1/68* (2013.01); *G06Q 20/3224* (2013.01); *H04B 5/0031* (2013.01); *H04W 4/02* (2013.01); *H04W 4/20* (2013.01); *H04W 4/80* (2018.02); *H04W 64/00* (2013.01); *H04W 76/10* (2018.02)

(58) Field of Classification Search
USPC ............................ 455/41.1, 41.2, 456.1–457
See application file for complete search history.

(56) References Cited

U.S. PATENT DOCUMENTS

| 6,041,133 A | 3/2000 | Califano et al. |
| 6,334,121 B1 | 12/2001 | Primeaux et al. |

(Continued)

FOREIGN PATENT DOCUMENTS

| CN | 1870025 | 11/2006 |
| CN | 101779180 | 7/2010 |

(Continued)

OTHER PUBLICATIONS

Office Action for U.S. Appl. No. 13/229,481, dated Oct. 23, 2014, Jeffrey M. Giard, "Multi-Factor Identity Fingerprinting with User Behavior", 22 pages.

(Continued)

*Primary Examiner* — Steven Kelley
(74) *Attorney, Agent, or Firm* — Lee & Hayes, PLLC

(57) ABSTRACT

A near field communication (NFC) mobile device may obtain location information from a NFC terminal device that is communicating with the NFC mobile device. A data transfer link may be established between the NFC mobile device and a mobile telecommunication network. The mobile telecommunication network may prompt the NFC mobile device to obtain location information from the NFC terminal device. The mobile telecommunication network may then receive the location information from the NFC mobile device via the data transfer link, and may subsequently determine a location of the NFC mobile device using the location information.

20 Claims, 11 Drawing Sheets

(51) Int. Cl.
*H04W 4/20* (2018.01)
*H04W 4/80* (2018.01)
*H04W 76/10* (2018.01)

(56) References Cited

U.S. PATENT DOCUMENTS

| | | | |
|---|---|---|---|
| 6,516,288 B2 | 2/2003 | Bagne | |
| 7,433,960 B1 | 10/2008 | Dube et al. | |
| 7,689,418 B2 | 3/2010 | Ramaswamy et al. | |
| 7,856,384 B1 | 12/2010 | Kulasooriya et al. | |
| 7,908,644 B2 | 3/2011 | Roskind et al. | |
| 8,316,086 B2 | 11/2012 | Ufford et al. | |
| 8,364,587 B2 | 1/2013 | Nuzum et al. | |
| 8,489,635 B1 | 7/2013 | Phoha et al. | |
| 9,824,199 B2* | 11/2017 | Kshirsagar | G06F 21/316 |
| 2002/0116508 A1 | 8/2002 | Khan et al. | |
| 2004/0162781 A1 | 8/2004 | Searl et al. | |
| 2005/0169504 A1 | 8/2005 | Black | |
| 2005/0228996 A1 | 10/2005 | Mayer | |
| 2006/0053296 A1 | 3/2006 | Busboom et al. | |
| 2006/0104484 A1 | 5/2006 | Bolle et al. | |
| 2006/0194592 A1* | 8/2006 | Clough | 455/456.3 |
| 2006/0265495 A1 | 11/2006 | Butler et al. | |
| 2006/0282660 A1 | 12/2006 | Varghese et al. | |
| 2007/0025245 A1 | 2/2007 | Porras et al. | |
| 2007/0236330 A1 | 10/2007 | Cho et al. | |
| 2007/0242827 A1 | 10/2007 | Prafullchandra et al. | |
| 2007/0254712 A1 | 11/2007 | Chitti | |
| 2007/0261116 A1 | 11/2007 | Prafullchandra et al. | |
| 2007/0262134 A1 | 11/2007 | Humphrey et al. | |
| 2008/0045232 A1* | 2/2008 | Cone | 455/456.1 |
| 2008/0091453 A1 | 4/2008 | Meehan et al. | |
| 2008/0091639 A1 | 4/2008 | Davis et al. | |
| 2008/0098456 A1 | 4/2008 | Alward et al. | |
| 2008/0162397 A1 | 7/2008 | Zaltzman | |
| 2008/0201212 A1 | 8/2008 | Hammad et al. | |
| 2008/0209229 A1 | 8/2008 | Ramakrishnan et al. | |
| 2009/0036111 A1 | 2/2009 | Danford et al. | |
| 2009/0049544 A1 | 2/2009 | Kashi | |
| 2009/0077033 A1 | 3/2009 | McGary et al. | |
| 2009/0089869 A1 | 4/2009 | Varghese | |
| 2009/0187492 A1* | 7/2009 | Hammad et al. | 705/26 |
| 2009/0203367 A1 | 8/2009 | Pamminger et al. | |
| 2009/0228370 A1 | 9/2009 | Shakkarwar | |
| 2009/0233622 A1* | 9/2009 | Johnson | 455/456.3 |
| 2009/0258637 A1 | 10/2009 | Liu et al. | |
| 2009/0260075 A1 | 10/2009 | Gedge et al. | |
| 2009/0299645 A1 | 12/2009 | Colby et al. | |
| 2010/0057843 A1 | 3/2010 | Landsman et al. | |
| 2010/0115610 A1 | 5/2010 | Tredoux et al. | |
| 2010/0125505 A1 | 5/2010 | Puttaswamy | |
| 2010/0130165 A1 | 5/2010 | Snyder et al. | |
| 2010/0274597 A1 | 10/2010 | Dill | |
| 2010/0274815 A1 | 10/2010 | Vanasco | |
| 2010/0291947 A1 | 11/2010 | Annamalai | |
| 2010/0293094 A1 | 11/2010 | Kolkowitz et al. | |
| 2010/0299292 A1 | 11/2010 | Collazo | |
| 2010/0299376 A1 | 11/2010 | Batchu et al. | |
| 2010/0305989 A1 | 12/2010 | Mu et al. | |
| 2010/0306832 A1 | 12/2010 | Mu et al. | |
| 2010/0325040 A1 | 12/2010 | Etchegoyen | |
| 2010/0325711 A1 | 12/2010 | Etchegoyen | |
| 2010/0332400 A1 | 12/2010 | Etchegoyen | |
| 2011/0009092 A1 | 1/2011 | Etchegoyen | |
| 2011/0016121 A1 | 1/2011 | Sambrani et al. | |
| 2011/0021187 A1 | 1/2011 | Jayapalan et al. | |
| 2011/0059751 A1* | 3/2011 | Zhang | G01S 19/48 455/456.1 |
| 2011/0077998 A1 | 3/2011 | Yan et al. | |
| 2011/0093920 A1 | 4/2011 | Etchegoyen | |
| 2011/0106610 A1 | 5/2011 | Landis et al. | |
| 2011/0154264 A1 | 6/2011 | Aravamudan et al. | |
| 2011/0173071 A1 | 7/2011 | Meyer et al. | |
| 2011/0178863 A1* | 7/2011 | Daigle | 705/14.31 |
| 2011/0231223 A1 | 9/2011 | Winters | |
| 2011/0231224 A1 | 9/2011 | Winters | |
| 2011/0231225 A1 | 9/2011 | Winters | |
| 2011/0231257 A1 | 9/2011 | Winters | |
| 2011/0231258 A1 | 9/2011 | Winters | |
| 2011/0231305 A1 | 9/2011 | Winters | |
| 2011/0276689 A1 | 11/2011 | Rosen | |
| 2011/0314558 A1 | 12/2011 | Song et al. | |
| 2011/0321157 A1 | 12/2011 | Davis et al. | |
| 2011/0321175 A1 | 12/2011 | Slater | |
| 2012/0066065 A1 | 3/2012 | Switzer | |
| 2012/0066611 A1 | 3/2012 | Aravamudan et al. | |
| 2012/0072546 A1 | 3/2012 | Etchegoyen | |
| 2012/0079576 A1 | 3/2012 | Han et al. | |
| 2012/0079588 A1 | 3/2012 | Aaron | |
| 2012/0084203 A1 | 4/2012 | Mehew et al. | |
| 2012/0094597 A1* | 4/2012 | Tysowski | G06Q 30/06 455/41.1 |
| 2012/0131034 A1 | 5/2012 | Kenedy et al. | |
| 2012/0131657 A1 | 5/2012 | Sunstein et al. | |
| 2012/0137340 A1 | 5/2012 | Jakobsson et al. | |
| 2012/0159564 A1 | 6/2012 | Spektor et al. | |
| 2012/0180107 A1 | 7/2012 | Gammill et al. | |
| 2012/0200389 A1 | 8/2012 | Solomon | |
| 2012/0204033 A1 | 8/2012 | Etchegoyen et al. | |
| 2012/0210388 A1 | 8/2012 | Kolishchak | |
| 2012/0226701 A1 | 9/2012 | Singh | |
| 2013/0097673 A1 | 4/2013 | Meehan et al. | |
| 2013/0133054 A1 | 5/2013 | Davis et al. | |
| 2013/0159413 A1 | 6/2013 | Davis et al. | |
| 2013/0167207 A1 | 6/2013 | Davis et al. | |
| 2013/0201000 A1 | 8/2013 | Solomon | |
| 2015/0242399 A1 | 8/2015 | Ramanathan et al. | |
| 2018/0039770 A1 | 2/2018 | Kshirsagar et al. | |

FOREIGN PATENT DOCUMENTS

| | | |
|---|---|---|
| CN | 102622718 | 8/2012 |
| JP | 2002288070 A | 10/2002 |
| JP | 2005038020 | 2/2005 |
| JP | 2010277356 | 12/2010 |
| JP | 201139674 | 2/2011 |
| WO | WO2005106523 | 11/2005 |
| WO | WO2010148860 | 12/2010 |
| WO | WO2011008848 | 1/2011 |
| WO | WO2013028794 | 2/2013 |

OTHER PUBLICATIONS

Office Action for U.S. Appl. No. 13/612,755, dated Nov. 4, 2014, Vinay Kshirsagar, "Multi-Factor Profile and Security Fingerprint Analysis", 18 pages.

Non-Final Office Action for U.S. Appl. No. 13/229,481, dated Jan. 16, 2013, Jeffrey M. Giard et al., "Multi-Factor Identity Fingerprinting with User Behavior", 8 pages.

A collection of press releases regarding MobileIron, Inc retrieved from <<http://www.dowjones.com/factiva/?from=factivaHome&link=>> on Nov. 15, 2011, 84 pages.

Buthpitiya et al., "n-gram Geo-Trace Modeling", In the Proceedings of the Ninth International Conference on Pervasive Computing, San Francisco, CA, Jun. 12-15, 2011, pp. 97-114.

Shi et al., "Implicit Authentication through Learning User Behavior", 13th Information Security Conference (ISC 2010), Boca Raton, FL, Oct. 25-28, 2010, 16 pages.

Extended European Search Report dated Mar. 4, 2014 for European patent application No. 12764304.7, 7 pages.

PCT Search Report and Written Opinion dated Mar. 13, 2013 for PCT Application No. PCT/US12/51927, 10 pages.

Non-Final Office Action for U.S. Appl. No. 13/612,755, dated Jun. 28, 2013, Vinay Kshiragar et al., "Multi-Factor Profile and Security Fingerprint Analysis", 8 pages.

Office Action for U.S. Appl. No. 13/229,481, dated Jul. 19, 2013, Giard et al., "Multi-Factor Identity Fingerprinting with User Behavior", 23 pages.

PCT Search Report and Written Opinion dated Aug. 29, 2012 for PCT Application No. PCT/US12/30353, 9 pages.

(56) References Cited

OTHER PUBLICATIONS

Extended European Search Report dated Jan. 30, 2015 for European Patent Application No. 12826129.4, 7 pages.
Office Action for U.S. Appl. No. 13/229,481, dated Feb. 24, 2015, Jeffrey M. Giard, "Multi-Factor Identity Fingerprinting with User Behavior", 22 pages.
Final Office Action for U.S. Appl. No. 13/612,755, dated Mar. 24, 2015, Vinay Kshirsagar, "Multi-Factor Profile and Security Fingerprint Analysis", 19 pages.
Final Office Action for U.S. Appl. No. 13/612,755, dated Nov. 7, 2013, Vinay Kshirsagar, "Multi-Factor Profile and Security Fingerprint Analysis", 15 pages.
PCT Search Report and Written Opinion dated Dec. 17, 2013 for PCT application No. PCT/US13/59479, 14 pages.
Partial Supplementary European Search Report dated Mo Mar. 30, 2016 for European Patent Application No. 13837114.1, 8 pages.
Office action for U.S. Appl. No. 13/229,481, dated Jun. 6, 2016, Giard et al., "Multi-Factor Identity Fingerprinting with User Behavior", 17 pages.
Translated Chinese Office Action dated Feb. 13, 2017 for Chinese Patent Application No. 201280024686.7, a counterpart foreign application of U.S. Appl. No. 13/427,365, 7 pages.
Chinese Office Action dated Jun. 7, 2016 for Chinese patent application No. 201280050746.2, a counterpart foreign application of U.S. Appl. No. 13/229,481, 20 pgs.
Chinese Office Action dated Jun. 7, 2016 for Chinese patent application No. 201280024686.7, a counterpart foreign application of U.S. Appl. No. 13/427,365, 28 pgs.
Extended European Search Report dated Jul. 21, 2016 for European patent application No. 13837114.1, 16 pages.
Final Office Action for U.S. Appl. No. 13/612,755, dated Sep. 14, 2016, Kshirsagar et al., "Multi-Factor Profile and Security Fingerprint Analysis", 16 pages.
Translated Chinese Office Action dated Mar. 9, 2017 for Chinese Patent Application No. 201280050746.2, a counterpart foreign application of U.S. Appl. No. 13/229,481, 8 pages.
Office Action for U.S. Appl. No. 13/612,755, dated Apr. 5, 2017, Vinay Kshiragar et al., "Multi-Factor Profile and Security Fingerprint Analysis", 8 pages.
Chinese Office Action dated Aug. 3, 2017 for Chinese patent application No. 201380047486.8, a counterpart foreign application of U.S. Appl. No. 13/612,755.
Chinese Office Action dated Apr. 18, 2018 for Chinese Patent Application No. 201380047486.8, a counterpart foreign application of U.S. Pat. No. 9,824,199.
Translated Japanese Office Action dated Apr. 18, 2018 for Japanse patent application No. 201380047486.8, a counterpart foreign application of U.S. Pat. No. 9,824,199.

* cited by examiner

SERVICE ENHANCEMENTS USING NEAR FIELD COMMUNICATION

CROSS REFERENCE TO RELATED PATENT APPLICATION

This patent application claims priority from U.S. Provisional Application No. 61/467,639, filed Mar. 25, 2011, which application is hereby incorporated in its entirety by reference.

BACKGROUND

Near field communication (NFC) is a short range wireless connectivity technology. NFC may enable simple and safe two-way interactions among electronic devices. The use of NFC-enabled electronic devices may allow users to perform contactless business transactions, access digital content, and/or connect to electronic devices with a single touch. Conventional techniques for locating electronic devices, such as mobile communication devices that are roaming on a mobile telecommunication network, may rely on the use of cellular triangulation or assisted GPS (A-GPS) technology. However, such techniques for locating electronic devices may fail when there is a lack of a clear cellular communication signal and/or GPS data signal.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
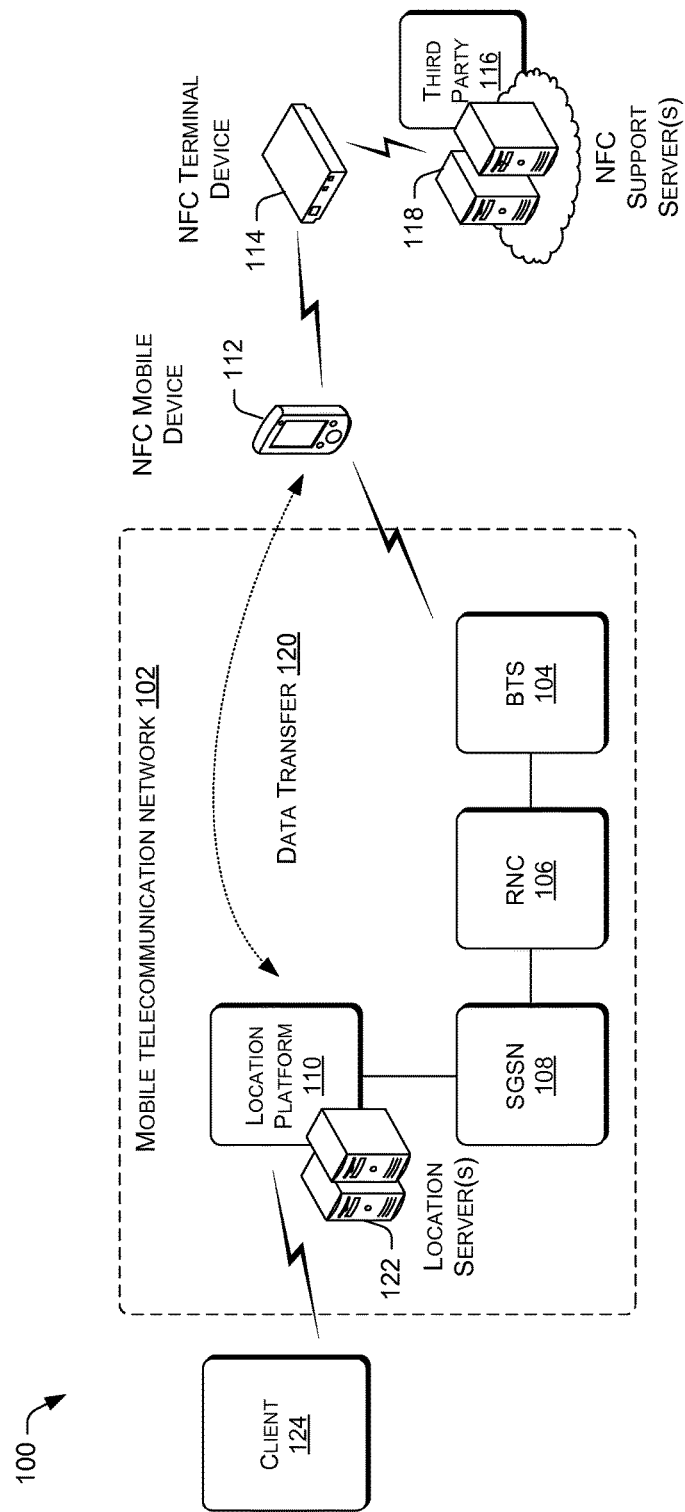
FIG. 1 is a block diagram showing an illustrative environment for acquiring the location of a near field communication (NFC) mobile device based on location information provided by a NFC terminal device.

Described herein are techniques for a mobile telecommunication network to locate a near field communication (NFC) mobile device based on location information obtained from a NFC terminal device. The NFC mobile device and the NFC terminal device may be equipped with NFC components that enable them to engage in two-way communication with each other. The NFC terminal device may be a stationary device located at a physical facility of an entity, such as at a store of a merchant. The NFC terminal device may be one of multiple NFC terminal devices that are controlled by a support server of a third party, such as a payment processor. For example, the third party may be a company that handles credit card transaction, and each of the NFC terminal devices controlled by the third party is a contactless payment terminal. Each of the contactless payment terminals may enable a customer with a NFC mobile device to pay for a purchase with an electronic wallet application on the NFC mobile device.

The third party may maintain location information for each of the NFC terminal devices controlled by the support server. For instance, each of the NFC terminal devices may be assigned a corresponding NFC device identifier by the support server, which the support server may maintain in a database. In some instances, the support server may also maintain location information in the form of geographical address information that correlates with the NFC device identifier of each NFC terminal device in the database. The geographical address information that correlates with each NFC device identifier may be in the form of global positioning coordinates (i.e., longitude and latitude coordinates), a street address, a business name, and/or other geographical location information.

In various scenarios, the mobile telecommunication network may locate a NFC mobile device based on the location information supplied by a NFC terminal device. In such scenarios, the mobile telecommunication network may prompt the NFC mobile device to request location information of a NFC terminal device that is in communication range of the NFC mobile device. Thus, assuming that the NFC mobile device is able to acquire the location information from a NFC terminal device, the NFC mobile device may pass the location information to the mobile telecommunication network.

Subsequently, a location server of the mobile telecommunication network may determine the location of the NFC mobile device based on the location information obtained by the NFC mobile device. For example, if the location information includes geographical address information, the location server may interpret the NFC mobile device as being located at a location that corresponds to the geographical address information. However, if the location information lacks geographical address information but includes a NFC device identifier, the location server of the mobile telecommunication network may consult an internal database that correlates NFC device identifiers to geographical locations to pinpoint the location of the NFC mobile device. In some embodiments, the internal database may be developed by the mobile telecommunication network independently of the database maintained by the third party.

In some scenarios, the NFC mobile device may, in addition to providing the location server of the mobile telecommunication network with NFC-based location information, also provide the location server with location information that is obtained using other techniques, such as Wi-Fi positioning, A-GPS positioning, and/or cellular triangulation. In various embodiments, the location server may correlate such location with the NFC-based location information to speed up the determination of the location of the NFC mobile device and/or verify a determined location of the NFC mobile device.

Once the location server of the mobile telecommunication network has determined the location of the NFC mobile device, the location server may pass the location of the mobile device to a client. For example, the client may be an advertiser that desires to send location-based advertisements to the NFC mobile device to promote a product or service to a user of the NFC mobile device. In another example, the client may be a parent who is trying to locate a child who is the user of the NFC mobile device. In yet another example, the client may be a payment processor who uses the location of the NFC mobile device to authorize payment transactions or detect fraudulent transactions.

In some implementations, a data transfer link may be established between the NFC mobile device and the mobile telecommunication network. The mobile telecommunication network may prompt the NFC mobile device to obtain location information from an NFC terminal device that is communicating with the NFC mobile device. The mobile telecommunication network may then further receive the location information from the NFC mobile device via the data transfer link, and may subsequently determine a location of the NFC mobile device using the location information.

Thus, the use of location information from NFC terminal devices may enable a mobile telecommunication network to locate NFC mobile devices without the use of other positioning techniques, such as cellular triangulation, A-GPS positioning, or Wi-Fi positioning. Accordingly, such techniques for locating a NFC mobile device may be immune to weak cellular signals, disrupted GPS signals, and/or attenuated Wi-Fi signals, which may occur at underground areas, rural areas, and/or any other areas where over-the-air signals may be missing or disrupted. As such, the use of NFC-based location information may provide an additional source of reliable location information on NFC mobile devices and may be the sole source when no other source of location information on such NFC mobile devices are available.

Overview

FIG. 1 is a block diagram showing an illustrative environment 100 for acquiring the location of a NFC mobile device based on location information provided by a NFC terminal device. The environment 100 may include a mobile telecommunication network 102. The mobile telecommunication network 102 may include multiple base transceiver stations (BTSs), such as a BTS 104, a radio network controller (RNC) 106, a serving GPRS support node (SGSN) 108, and a location platform 110. In some embodiments, the SGSN 108 may include a gateway GPRS support node (GGSN). In at least one embodiment, the mobile telecommunication network may include an IP-based network that provides data services, in addition to providing voice communication services.

The BTS 104 may include radio transceivers that communicate with multiple NFC mobile devices, such as the NFC mobile device 112. Each of the NFC mobile devices may be a mobile phone, at tablet computer, a portable computer, a personal digital assistant (PDA), or any other portable electronic device that is similarly equipped with a NFC transceiver component (e.g., NFC transceiver chip, NFC antenna, etc.) and a cellular communication component that enables the portable electronic device to exchange voice and digital data with the mobile telecommunication network 102. In some embodiments, each of the NFC mobile devices may also include a Wi-Fi transceiver, an A-GPS receiver, and/or a GPS receiver. The A-GPS receiver or the GPS receiver may enable a NFC mobile device to obtain its geographical location via satellite signals.

The RNC 106 may be responsible for controlling multiple base transceiver stations, such as the BTS 104. For example, the RNC 106 may perform radio resource management functions for the multiple base transceiver stations. The SGSN 108 and its equivalent GGSN may be a part of the mobile telecommunication network 102 that transmit internet protocol (IP) packets to other networks, such as the Internet. For example, the SGSN 108 may be responsible for the exchange of IP data packets between the NFC mobile device 112 and a server that is a part of and/or external to the mobile telecommunication network 102.

The location platform 110 may be responsible for determining a location of a NFC mobile device, such as the NFC mobile device 112. In various embodiments, the location platform 110 may use one or more techniques to determine the location. Such techniques may include the use of GPS positioning, Wi-Fi positioning, and/or cellular positioning. In GPS positioning, the location platform 110 may extract GPS position data from an A-GPS receiver or a GPS receiver of the NFC mobile device 112. Based on the extracted GPS position data, the location platform 110 may determine a geographical location of the NFC mobile device 112.

In Wi-Fi positioning, the location platform 110 may obtain a media access control (MAC) address of a wireless access point (WAP) that is connected with the NFC mobile device 112. The location platform 110 may then look up the MAC address in a database that correlates MAC addresses to geographical locations. The correlations of MAC addressees to geographical locations may have been obtained in advance by using techniques such as war driving, and/or collecting data from mobile devices that have both Wi-Fi and GPS capabilities.

In cellular positioning, the location platform 110 may use data received from multiple base transceiver stations to triangulate the location of the NFC mobile device 112. The location of the NFC mobile device 112 may be determined based on the round trip times (RTTs) and/or signal strengths reported by the multiple base transceiver stations as the stations communicate with the NFC mobile device 112. Since the base transceiver stations have known fixed geographical positions, the use of the RTTs and/or signal strengths may enable a location of the NFC mobile device 112 to be mathematically computed. However, in some instances the NFC mobile device 112 may be in communication with less than a requisite number of base transceivers stations for performing cellular triangulation (e.g., NFC mobile device 112 communicating with a single base transceiver station). In such instances, the location platform 110 may also use the known geographical position of one base transceiver station as an approximate position of the NFC mobile device 112.

Alternatively or concurrently, the location platform 110 may also perform NFC-based positioning. In NFC-based positioning, the location platform 110 may request that the NFC mobile device 112 acquire location information from a NFC terminal device, such as the NFC terminal device 114. The NFC terminal device 114 may include NFC components (e.g., NFC transceiver chip, NFC antenna, NFC reader, etc.) for transmitting data to and receiving data from NFC mobile devices. In some instances, the NFC terminal device 114 may be a NFC terminal device that is already communicating with the NFC mobile device 112. In other instances, the NFC terminal device 114 may be a NFC terminal device that comes into communication range with the NFC mobile device 112 after the location platform 110 sends the request to the NFC mobile device 112.

The NFC terminal device 114 may be one of multiple NFC terminal devices that are controlled by one or more support servers 118 of a third party 116, such as a payment processor. For example, the third party 116 may be a company that handles credit card transactions. In such an example, each of the NFC terminal devices controlled by the third party may be a contactless payment terminal that enables a customer with a NFC mobile device to pay for a purchase with an electronic wallet application.

The third party 116 may maintain location information for each of the NFC terminal devices. For instance, each of the NFC terminal devices may be assigned a corresponding NFC device identifier by the support servers 118, which the support servers 118 may store in a database. In some instances, the support servers 118 may also maintain location information in the form of geographical address information that correlates with the NFC device identifier of each NFC terminal device. The geographical address information that correlates with each NFC device identifier may be in the form of global positioning coordinates (i.e., longitude and latitude coordinates), an address, a business name, and/or other geographical location information.

In various embodiments, the NFC mobile device 112 may acquire location information from the NFC terminal device 114 via a data transfer 120. The location information may be a NFC device identifier of the NFC terminal device 114. In such a scenario, the location platform 110 may consult an internal database that that correlates NFC device identifiers to geographical locations to pinpoint the location of the NFC terminal device 114 (e.g., longitude and latitude coordinates, address, etc.). The location platform 110 may then designate the location of the NFC terminal device 114 as a current location of the NFC mobile device 112.

In some embodiments, the internal database may have been previously developed by monitoring the locations of multiple NFC mobile devices as they interact with different NFC terminal devices. For example, when a NFC mobile device communicates with a particular NFC terminal device, the location platform 110 may automatically obtain an NFC device identifier of the particular NFC terminal device. The location platform 110 may further obtain an associated location of the NFC mobile device using a non-NFC positioning technique (e.g., A-GPS, Wi-Fi positioning, cellular triangulation, etc.). Once obtained, the location platform 110 may save the NFC device identifier of the particular NFC terminal device and the associated location information as a database entry in the internal database. Thus, by leveraging multiple NFC mobile devices over time, the location platform 110 may develop the internal database to store locations of various NFC terminal devices in a region. However, in other embodiments, the location platform 110 may acquire data that correlates NFC device identifiers to address information directly from one or more third parties that operates networks of NFC terminal devices, such as the third party 116. For example, an administrator of the location platform 110 may purchase or otherwise obtain such data from the third party 116 for storage in the internal server.

In some scenarios, the location platform 110 may use location-related data acquired using other positioning techniques in conjunction with the NFC-based location information acquired from a NFC terminal device to determine a position of the NFC mobile device 112. For example, the NFC terminal device 114 may have a NFC device identifier that is unique in the NFC network operated by the third party 116. However, the NFC device identifier of the NFC terminal device 114 may be identical to the NFC device identifier of a NFC terminal device that is a part of another network operated by a different third party. In such scenarios, looking up the NFC device identifier in the internal database may result in two potential locations for the NFC mobile device 112. Accordingly, the location platform 110 may use alternative location-related data, such as a cellular triangulated position of the NFC mobile device 112, to cross reference the two potential locations and eliminate one of the potential locations as erroneous.

In other implementations, the location platform 110 may first use the alternative location information to speed up the determination of a location of the NFC mobile device 112 by eliminating irrelevant location entries in the internal database. Subsequently, the location platform 110 may search the remaining location entries in the internal database for a location that matches a NFC device identifier acquired by the NFC mobile device 112.

Alternatively, the location information acquired by the NFC mobile device 112 from the NFC terminal device 114 may include geographical address information (e.g., longitude and latitude coordinates, address, etc.). Accordingly, the location platform 110 may directly use the geographical address information as the determined location of the NFC mobile device 112. However, in some instances, the location platform 110 may use the location-related data acquired using other positioning techniques to verify that the geographical address information provided by the NFC terminal device 114 is valid. For example, the NFC mobile device 112 may be further connected to a WAP. Accordingly, the location platform 110 may acquire a MAC address of the WAP from the NFC mobile device 112, and then use Wi-Fi positioning to acquire an alternative possible location for the NFC mobile device 112 using the MAC address.

The location platform 110 may then compare the geographical address information to the alternative possible location. As such, if the location platform 110 determines that the location indicated by the geographical address information is within a certain proximity of the alternative possible location (e.g., within a predetermined distance threshold), the location platform 110 may deemed the geographical address information as indicating a valid location for the NFC mobile device 112. Otherwise, the location platform 110 may deemed the geographical address information as indicating an invalid location.

In some embodiments, the location platform 110 may be an implementation of a Secure User Plane (SUPL) Location Platform (SLP). The location platform 110 may include one or more location servers 122 that perform the location functions described above. In at least one embodiment, the one or more location servers 122 may be implemented as a part of a SUPL location Center (SLC) and/or a part of the SUPL Positioning Center (SPC) within the SLP.

The client 124 may request the location of the NFC mobile device 112 from the location platform 110. For example, the client 124 may be an advertiser that desires to send location-based advertisements to the NFC mobile device 112 to promote a product or service. In another example, the client may be a parent who is trying to locate a child who is the user of the NFC mobile device 112. In yet another example, the client may be a payment processor who uses the location of the NFC mobile device 112 to authorize payment transactions or detect fraudulent transactions. Accordingly, when the location platform 110 is an implementation of the SLP, the request of the location of the NFC mobile device 112 and the data transfer 120 may be performing via a process known as user plane positioning.

Figure 2:
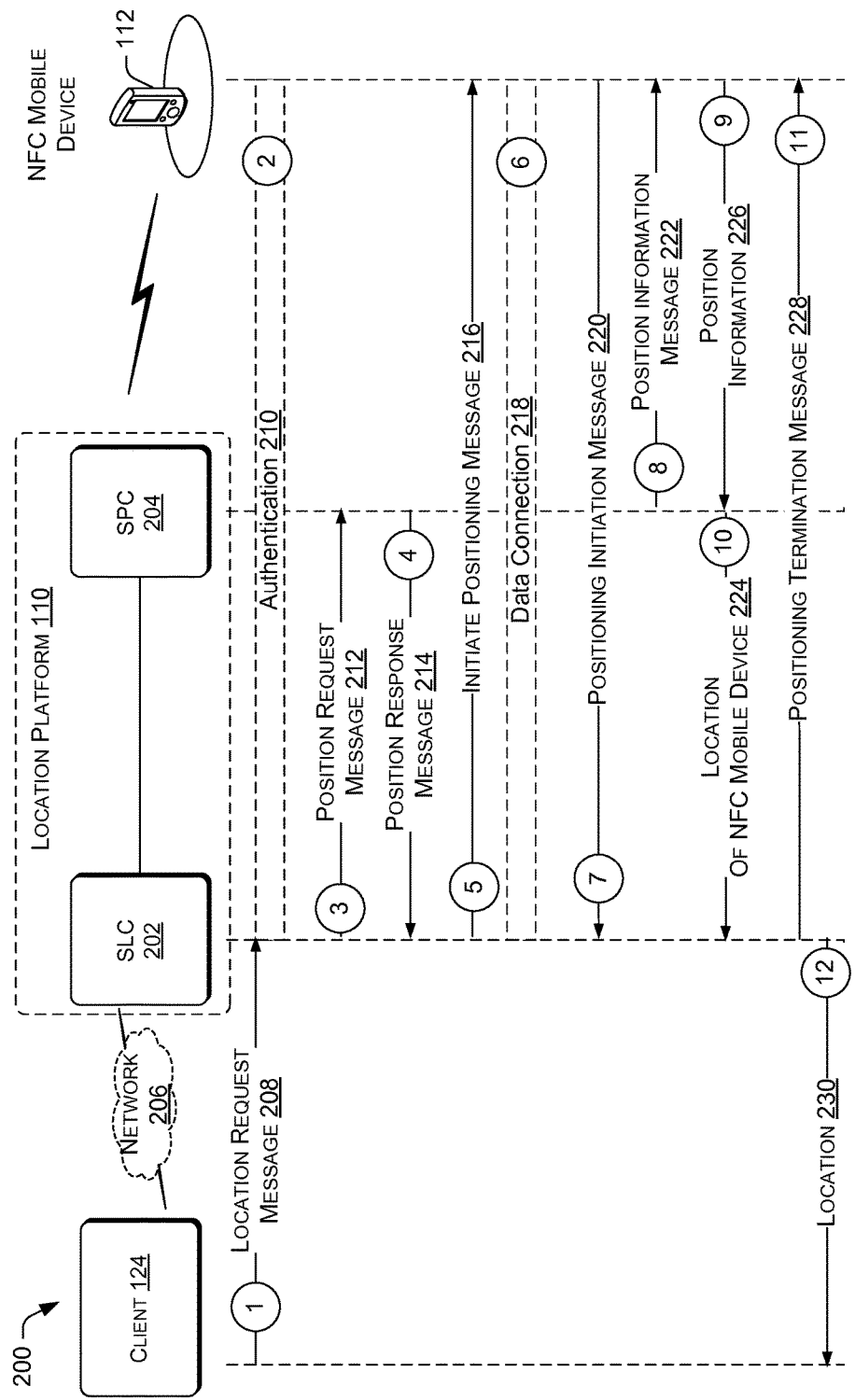
FIG. 2 is a schematic diagram that shows a data flow for acquiring NFC mobile device location information using components of the illustrative environment.

FIG. 2 is a schematic diagram that shows a data flow 200 for acquiring the location information for a NFC mobile device to a client 124 via user plane positioning. The data flow 200 may include steps that exchange data between the client 124, a SLC 202, a SPC 204, and the NFC mobile device 112. The SLC 202 and the SPC 204 may be parts of the SLP. As shown, the client 124 may communicate with the SLC 202 of the location platform 110 via a network 206. The network 206 may be a local area network ("LAN"), a larger network such as a wide area network ("WAN"), and/or a collection of networks, such as the Internet. In turn, the SLC 202 may exchange data with the SPC 204 within the location platform 110. The SPC 204 may further exchange data with a NFC mobile device, such as the NFC mobile device 112, via cellular data communication.

In an initial step, the client 126 may send a location request message 208 to the SLC 202 requesting a location for the NFC mobile device 112. The location request message 208 may be in the form of a Mobile Location Protocol (MLP) Standard Location Immediate Request (SLIR) message. In a second step, the SLC 202 may initiate an authentication 210 within the mobile telecommunication network 102 to determine if positioning to the NFC mobile device 112 is permitted. In various embodiments, positioning to the NFC mobile device 112 may be disallowed if the SLC 202 is unable to authenticate that the NFC mobile device 112 is currently communicating with the mobile telecommunication network 102. Otherwise, the authentication 210 may be deemed successful.

In a third step, the SLC 202 may send a position request message 212 to the SPC 204. The position request message 212 may initiate the SPC 204 to prepare to obtain the NFC-based location information for the NFC mobile device 112. The position request message 212 may be in the form of a PREQ message that requests a SUPL session from the SPC 204. In at least one embodiment, the position request message 212 may include device identification information for the NFC mobile device 112.

In a fourth step, the SPC 204 may reply back to the SLC 202 with a position response message 214. The position response message 214 may indicate that the SPC 204 has positioning capability, which is the ability to provide the NFC-based location information of a NFC mobile device. The position response message 214 may be in the form of a PRES message that is exchanged between the SPC 204 and the SLC 202.

In a fifth step, the SLC 202 may send a short message service (SMS) message 216 to the NFC mobile device 112. The SMS message 216 may inform the NFC mobile device 112 to start a SUPL location procedure. In the sixth step, the NFC mobile device 112 may establish a data connection 218 with the SLC 202. The data connection 218 may enable the SLC 202 to cryptographically exchange data with the NFC mobile device 112. In at least one embodiment, the establishment of the data connection 218 may include the use of a Transport Layer Security (TLS) handshake.

In a seventh step, following the establishment of the data connection 218, the NFC mobile device 112 may send a positioning initiation message 220 to the SLC 202. The positioning initiation message may prompt the SLC 202 to start positioning. The positioning initiation message 220 may be in the form of a SUPL POS INI message that starts a secure user plane positioning procedure.

In an eighth step, the SLC 202 may send a position measurement message 222 to the NFC mobile device 112. The position measurement message 222 may instruct the NFC mobile device 112 to acquire NFC-based location information from a NFC terminal device that is within communication range, such as the NFC terminal device 114. The location information may include a NFC network identifier of the NFC terminal device. Alternatively or concurrently, the location information may also include geographical address information for the NFC terminal device. In some embodiments, the position measurement message 222 may also instruct the NFC mobile device 112 to acquire other location information, such as an A-GPS positioning measurement, an available Wi-Fi network identifier, and/or the like.

In a ninth step, the NFC mobile device 112 may return position information 226 to the SPC 204. The position information 226 may include NFC-based location information (e.g., NFC device identifier and/or geographical address information for the NFC terminal device). In some embodiments, the position information 226 may also include the other location information acquired by the NFC mobile device 112 using other techniques.

Based on the position information 226, the SPC 204 may determine the location of the NFC mobile device 112 as described above in FIG. 1 with respect to the location platform 110. For example, the determination may be accomplished using the NFC-based location information and/or the location-related data acquired using other sources.

In a tenth step, the SPC 204 may deliver the determined location of the NFC mobile device 112 to the SLC 202. In an eleventh step, the SLC 202 may send a positioning termination message 228 to the NFC mobile device 112. The positioning termination message 228 may be in the form of a SUPL END message that terminates the secure user plane positioning procedure. In a twelfth step, the SLC 202 may send the determined location of the NFC mobile device 112 to the client 126.

Figure 3:
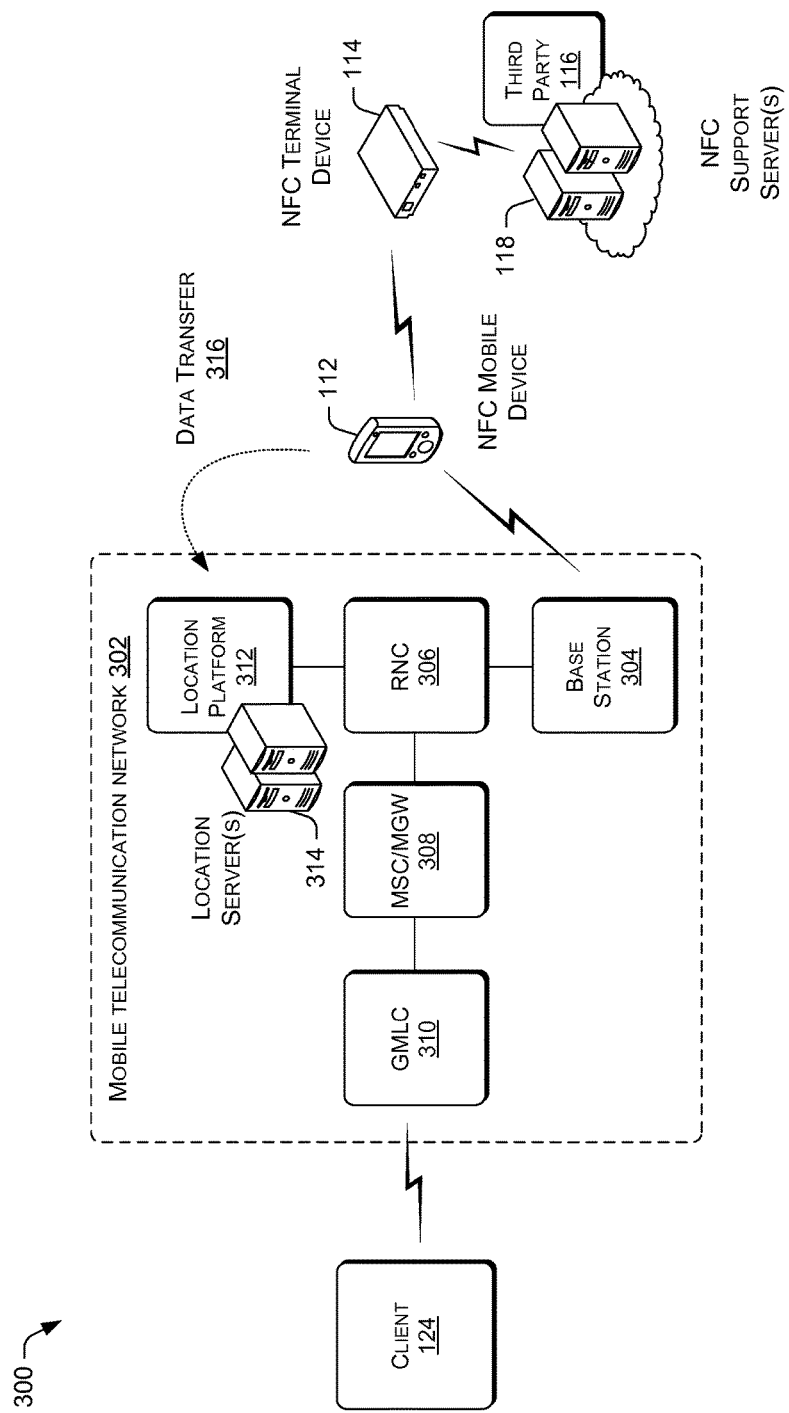
FIG. 3 is a block diagram showing an additional illustrative environment for acquiring the location of a NFC mobile device based on location information provided by a NFC terminal device.

FIG. 3 is a block diagram showing an additional illustrative environment 300 for acquiring the location of a NFC mobile device based on location information provided by a NFC terminal device. The environment 300 may include a mobile telecommunication network 302. The mobile telecommunication network 302 may include multiple base transceiver stations (BTSs), such as the BTS 304, a radio network controller (RNC) 306, a mobile switching center (MSC) 308, a gateway mobile location center (GMLC) 310, and a location platform 312. In some embodiments, the MSC 308 may include a media gateway (MGW).

The BTS 304 may include radio transceivers that communicate with multiple NFC mobile devices, such as the NFC mobile device 112. The RNC 306 may be responsible for controlling multiple base transceiver stations, such as a BTS 304. For example, the RNC 306 may perform radio resource management functions for the multiple base transceiver stations.

The MSC 308 may provide voice call and SMS message routing functions, as well as other services, for the mobile telecommunication network 302. The GMLC 310 may provide functionalities to support location services. The GMLC 310 may be accessible to a client, such as the client 124, that desires to access location information of NFC mobile devices from the mobile telecommunication network 302.

The location platform 312 may include one or more location servers 314 that perform similar functions as the functions performed by the one or more location servers 122 of the location platform 110. In other words, the location platform 312 may be responsible for determining a location of a NFC mobile device, such as the NFC mobile device 112. In various embodiments, the location platform 110 may use one or more techniques to determine the location. Such techniques may include the use of GPS positioning, Wi-Fi positioning, and/or cellular triangulation.

Alternatively or concurrently, the location platform 312 may also perform NFC-based positioning. In NFC-based positioning, the location platform 110 may request that the NFC mobile device 112 acquire location information (e.g., NFC device identifier and/or geographical address information) from a NFC terminal device, such as the NFC terminal device 114. As described above, the NFC terminal device 114 may be one of multiple NFC terminal devices that are controlled by the one or more support servers 118 of the third party 116.

Accordingly, the client 124 may request the location of the NFC mobile device 112 from the location platform 312. In various embodiments, the location platform 312 may be a standalone serving mobile location center (SMLC), and the standalone SMLC may be referred to as a SAS. In turn, the location platform 312 may determine a location of the NFC mobile device 112 based on the NFC-based location information and/or one or more other sources of positioning data sent to the location platform via data transfer 316. The location platform 312 may use the information to determine the location of the NFC mobile device 112 in various manners as described with respect to the location platform 110 illustrated in FIG. 1. Accordingly, when the location platform 312 is an implementation of the SAS, the request of the location of the NFC mobile device 112 and the data transfer 316 may be performing via a procedure known as control plane positioning.

Once the location platform 312 has determined the location, the location platform 312 may pass the determined location of the NFC mobile device 112 to the client 124. The client 124 may use the location to perform tasks with respect to a user of the NFC mobile device 112. For example, the client 124 may be an advertiser that desires to send location-based advertisements to the NFC mobile device 112 to promote a product or service to a user of the NFC mobile device 112.

Figure 4:
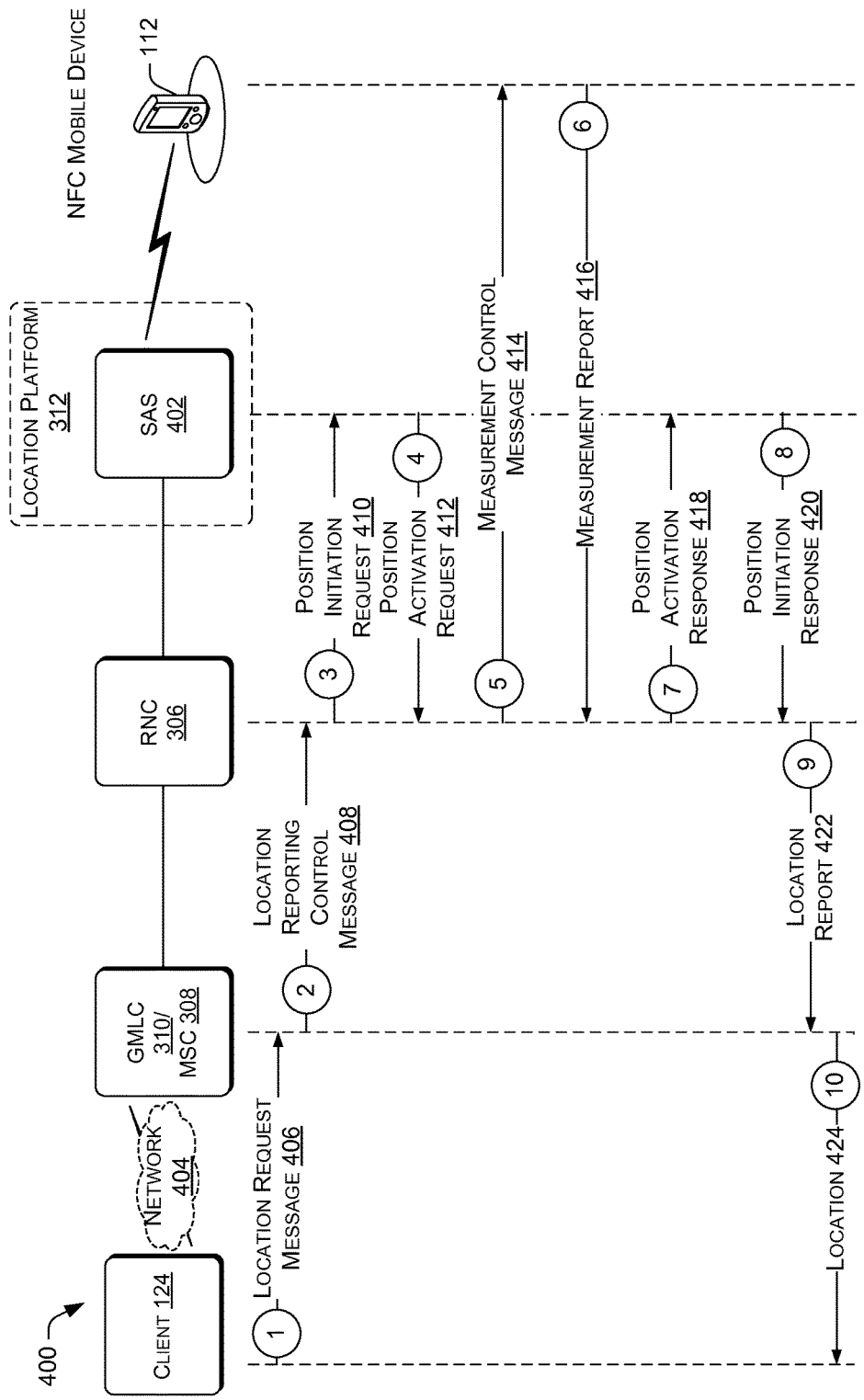
FIG. 4 is a schematic diagram that shows a data flow for acquiring NFC mobile device location information using components of the additional illustrative environment.

FIG. 4 is a schematic diagram that shows a data flow 400 for acquiring NFC mobile device location information using components of the additional illustrative environment 300. The data flow 400 may include steps that exchange data between the client 124, the GMLC 310, the RNC 306, an SAS 402, and the NFC mobile device 112. In various embodiments, the SAS 402 may be an implementation of the location platform 312. As shown, the client 124 may communicate with the SLC 202 of the location platform 110 via a network 404. The network 404 may be a local area network ("LAN"), a larger network such as a wide area network ("WAN"), and/or a collection of networks, such as the Internet. In turn, the GMLC 310, the RNC 306, and the SAS 402 may exchange data within the mobile telecommunication network 302. The SAS 402 may further exchange data with a NFC mobile device, such as the NFC mobile device 112, via cellular data communication.

In an initial step, the client 126 may send a location request message 406 to the GMLC 310 to request a location of the NFC mobile device 112. The location request message 406 may be in the form of a Mobile Location Protocol (MLP) Standard Location Immediate Request (SLIR) message.

In a second step, the GMLC 310 may send a location report control message 408 to the RNC 306. In some embodiments, the MSC 308, rather than the GMLC 310, may send the location report control message 408. The location report control message 408 may request that the RNC 306 provide the location of the NFC mobile device 112. In a third step, the RNC 306 may send a position initiation request message 410 to the SAS 402 to request the location of the NFC mobile device 112. The position initiation request message 410 may include an indication of one or more positioning techniques that may be used by the NFC mobile device 112 (e.g., NFC positioning, WI-FI positioning, A-GPS positioning, and/or the like.).

In a fourth step, the SAS 402 may send back a position activation request message 412 to the RNC 306 acknowledging the receipt of the position initiation request message 410. The position activation request message 412 may include data (e.g., radio signal measurements from the NFC mobile device 112) that may assist the RNC 306 with locating the device. For example, the radio signal measurements may indicate an approximate region occupied by the NFC mobile device 112.

In a fifth step, the RNC 306 may send a measurement control message 414 to the NFC mobile device 112. The measurement control message 414 may request for one or more types of location information from the NFC mobile device 112. The types of location information may include NFC-based location information (e.g., NFC device identifier and/or geographical address information for a NFC terminal device), Wi-Fi positioning data, A-GPS positioning data, and/or the like). The NFC mobile device 112 may acquire the NFC-based location information from a NFC terminal device that is in communication range with the NFC mobile device 112, such as the NFC terminal device 114.

In a sixth step, the NFC mobile device 112 may send back a measurement report 416 to the RNC 306. The measurement report 416 may include the location information that is requested by the RNC 306 in the measurement control message 414. In a seventh step, the RNC 306 may use a position activation response message 418 to relay the location information to the SAS 402. The SAS 402 may determine the location of the NFC mobile device 112. In various embodiments, the determination of the location may be accomplished using the NFC-based location information and/or the location-related data acquired using other sources as previously described with respect to the location platform 110.

In an eighth step, the SAS 402 may send the determined location of the NFC mobile device 112 to the RNC 306 in a position initiation response 420. In a ninth step, the RNC 306 may use a location report message 422 to forward the determined location of the NFC mobile device 112 to the GMLC 310 or the MSC 308. At the tenth step, the GMLC 310 or the MSC 308 may report the location of the NFC mobile device 112 to the client 124 via a location message 424.

Example Server Components

Figure 5:
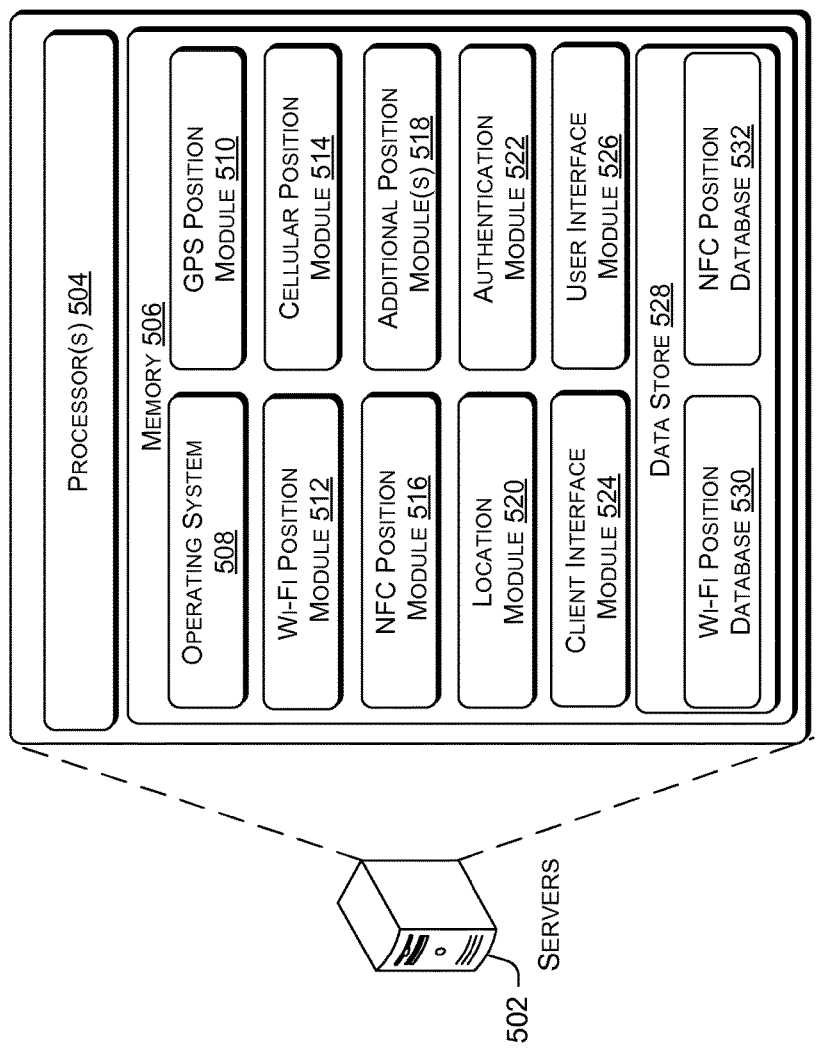
FIG. 5 is a block diagram that illustrates selected components of a server in a mobile telecommunication network that determine the locations of NFC mobile devices.

FIG. 5 is a block diagram that illustrates selected components of one or more servers 502 in a mobile telecommunication network that determine the locations of NFC mobile devices. In some embodiments, the servers 502 may be the location servers 122 that are implemented by the location platform 110 of the mobile telecommunication network 102. In other embodiments, the servers 502 may be the location servers 314 that are implemented by the location platform 312 of the mobile telecommunication network 302.

The servers 502 may include one or more processors 504, memory 506, and/or user controls that enable a user to interact with the servers. The memory 506 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

The servers 502 may have network capabilities. For example, the servers 502 may exchange data with other electronic devices (e.g., laptops, computers, other servers, etc.) via one or more networks, such as the Internet. Communications between the servers 502 and the other electronic devices may utilize any sort of communication protocol for sending and receiving messages, such as TCP/IP and/or HTTP. In some embodiments, the servers 502 may be substituted with a plurality of networked servers, such as servers in a cloud computing network.

The one or more processors 504 and the memory 506 of the servers 502 may implement an operating system 508. The operating system 508 may include components that enable the servers 502 to receive and transmit data via various inputs (e.g., user controls, network interfaces, and/or memory devices), as well as process data using the one or more processors 504 to generate output. The operating system 508 may include a presentation component that presents the output (e.g., display the data on an electronic display, store the data in memory, transmit the data to another electronic device, etc.). Additionally, the operating system 508 may include other components that perform various additional functions generally associated with an operating system.

The one or more processors 504 and the memory 506 of the servers 502 may also implement a GPS position module 510, a Wi-Fi position module 512, a cellular position module 514, a NFC position module 516, one or more additional position modules 518, a location module 520, an authentication module 522, a client interface module 524, and a user interface module 526. The memory may also include a data store 528.

The GPS position module 510 may receive GPS position data from a NFC mobile device, such as the NFC mobile device 112. In at least one embodiment, the GPS position module 510 may receive the GPS position data via the control plane positioning procedure or the user plane positioning procedure described above. In other words, the GPS position module 510 may receive GPS position data from an A-GPS or a GPS receiver of the NFC mobile device 112. Based on the extracted GPS position data, the location platform 110 may determine a geographical location of the NFC mobile device 112.

The Wi-Fi position module 512 may initiate a Wi-Fi positioning request and receive Wi-Fi location information from a NFC mobile device, such as the NFC mobile device 112. The Wi-Fi location information may be in the form of a MAC address of a WAP that is communicating with the NFC mobile device 112. In at least one embodiment, the Wi-Fi position module 512 may receive the Wi-Fi location information via the control plane positioning procedure or the user plane positioning procedures described above. Once the Wi-Fi position module 512 has received the MAC address of the WAP, the Wi-Fi position module 512 may look up the MAC address in a Wi-Fi position database 530 that correlates MAC addresses to geographical locations. Accordingly, the Wi-Fi position module 512 may determine the position of the NFC mobile device 112.

The cellular position module 514 may use data received from multiple base transceiver stations to estimate the location of a NFC mobile device, such as the NFC mobile device 112. The location of the NFC mobile device 112 may be determined based on the round trip times (RTTs) and/or signal strengths reported by the multiple base transceiver stations regarding their communications with the NFC mobile device 112. Since the base transceiver stations have known fixed geographical positions, the use of the RTTs and/or signal strengths may enable a location of the NFC mobile device 112 to be mathematically computed. However, in some instances the NFC mobile device 112 may be in communication with less than the number of base transceivers stations for performing cellular triangulation. In such instances, the location platform 110 may also use the known geographical position of one base transceiver station as the approximate position of the NFC mobile device 112.

The NFC position module 516 may initiate a NFC positioning request and receive NFC-based location information from a NFC mobile device, such as the NFC mobile device 112. Accordingly, the NFC position module 516 may perform the data flow steps described in FIG. 2 or FIG. 4. The NFC-based location information may include a NFC device identifier of a NFC terminal device, such as the NFC terminal device 114, which is currently in communication with the NFC mobile device 112. Concurrently or alternatively, the NFC-based location information may include geographical address information of the NFC terminal device. The geographical address information may be in the form of global positioning coordinates (i.e., longitude and latitude coordinates), an address, a business name, and/or other geographical location information.

If the location information includes geographical address information, NFC position module 516 may interpret the NFC mobile device as being located at a location that corresponds to the geographical address information. However, if the location information lacks geographical address information but includes a NFC device identifier, NFC position module 516 may consult a NFC position database 532 that correlates NFC device identifiers to geographical locations to pinpoint the location of the NFC mobile device.

The one or more additional position modules 518 may initiate additional location requests and receive additional location information from a NFC mobile device, such as the NFC mobile device 112. For example, the additional location information may include location information obtained from a Bluetooth device or an ultra mobile broadband (UMB) device that is communicating with the NFC mobile device 112. However, the one or more additional position modules 518 may also obtain location information from other positioning capabilities of the NFC mobile device 112.

The location module 520 may coordinate the various position modules of the servers 502 to obtain a determined location for a NFC mobile device 112, regardless of the type of location information available. For example, when the GPS position module 510 is unable to receive sufficient A-GPS positioning data from the NFC mobile device 112 to pinpoint the location of the device, the location module 520 may initiate the NFC position module 516 to obtain NFC-based location information from a NFC terminal device that is communicating with the NFC mobile device 112. The location module 520 may use the NFC position module 516 to determine the location based on the NFC-based location information. Alternatively, the NFC position module 516 may also feed the location information that is obtained by the NFC position module 516 to the GPS position module 510 to assist the A-GPS in determining the location of the NFC mobile device.

The location module 520 may also cross reference a location that obtained from by one position module against another location obtained by another position module to obtain a confirmed location. Further, when the cross reference indicates that the proximity of the locations are not within a predetermined threshold, the location module 520 may verify and correct a database entry that lead to the erroneous determined location.

For example, a location of the NFC mobile device 112 as obtained by the Wi-Fi position module 512 may not be within a predetermined proximity threshold of a location for the same device as obtained by the NFC position module 516 at approximately the same time. Accordingly, in order to remedy the discrepancy, the location module 520 may use the GPS position module 510 to obtain another location for the NFC mobile device 112. Thus, assuming that the GPS-obtained location indicates that the NFC-obtained location is erroneous, the location module 520 may prompt the NFC position module 516 to update the corresponding database entry in the NFC position database 532 for the NFC terminal device 114 with the correct location information from the GPS position module 510.

In another example, the location module 520 may also perform the above described cross reference and/or correction when a corresponding data entry in the NFC position database 532 is outdated, such as when the data entry has not been modified for a predetermined amount time.

In some embodiments, the location module 520 may also distribute location information obtained by another position module to the NFC position module 516. In this way, the location module 520 may speed up the determination of the location of the NFC mobile device 112 by the NFC position module 516. For example, the location module 520 may pass on an approximate location of the NFC mobile device 112 that is obtained by the cellular position module 514. The NFC position module 516 may then use the approximate location to eliminate data entries in the NFC position database 532 that pertain to locations that are not within a predetermined proximity of the approximate location. Subsequently, the NFC position module 516 may search the remaining database entries in the NFC position database 532 for an entry that provides a determined location that matches a NFC device identifier acquired by the NFC mobile device 112.

The authentication module 522 may authenticate a NFC mobile device, such as the NFC mobile device 112, to a mobile telecommunication network. The mobile telecommunication network may be the mobile telecommunication network 102 or the mobile telecommunication network 302. The authentication of the NFC mobile device may enable the device to operate on the mobile telecommunication network. Otherwise, the NFC mobile device may be denied access to the mobile telecommunication network. The authentication module 522 may perform the authentication as a NFC mobile device is roaming on the mobile telecommunication network. In some embodiments, the authentication module 522 may authenticate the NFC mobile device 112 to access the mobile telecommunication network when a determined location of the NFC mobile device 112 is within a geographical region previously designated by a user of the device. Otherwise, authentication will fail and the NFC mobile device 112 may be denied access to the mobile telecommunication network.

In other embodiments, the authentication module 522 may authenticate the NFC mobile device 112 to access the mobile telecommunication network when a determined location of the NFC mobile device 112 is within a predetermined distance of a last determined location of the NFC mobile device 112. Otherwise, authentication will fail and the NFC mobile device 112 may be denied access to the mobile telecommunication network. Accordingly, the authentication module 522 may store and use the locations of the NFC Mobile device 112 as periodically reported by the location module 520 to perform such authentication. Such authentication measures may prevent the unauthorized use of stolen or lost mobile devices on the mobile telecommunication network. However, in additional embodiments, the authentication module 522 may be capable of authentication NFC mobile devices to the mobile telecommunication network without the use of location information on of the NFC mobile devices. For example, authentication may be performed with the use of a device identifier of a NFC mobile device, and/or through the use of other authentication credentials (e.g., login name, password, secret key, etc.).

The client interface module 524 may receive requests for locations of NFC mobile devices from one or more clients, such as the client 124. In various embodiments, the requests may be in the form of electronic location request messages, such as the location request message 208. In turn, the client interface module 542 may provide locations of NFC mobile devices as determined by the location module 520 to the one or more clients. Each of the determined locations provided by the client interface module 524 may be in the form of global positioning coordinates (i.e., longitude and latitude coordinates), an address, a business name, and/or the like. In some instances, a client may pay a fee (e.g., per location fee, monthly subscription fee, etc.) to receive one or more locations of NFC mobile devices form the client interface module 524. In this way, a mobile telecommunication network may receive an additional revenue stream for provide the locations of the NFC mobile devices.

The user interface module 322 may enable a user to interact with the various modules on the servers 502 using a user interface. The user interface may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. In various embodiments, the user interface module 322 may enable an administrator to update the Wi-Fi position database 530 and/or the NFC position database 532.

It will be appreciated that while the location platform 110 and the location platform 312 are described as obtaining the location of a NFC mobile device upon requests from clients, the location platform 110 or the location platform 312 may request the location of a NFC mobile device on its own initiative. Additionally, each of the NFC mobile devices described in the context of the location platform 110 or the location platform 312 may be configured by a user to decline to provide location information. For example, a NFC mobile device may include a device setting option that enables the user to configure whether location information for the NFC mobile may be collected by a mobile telecommunication network. In this way, the user may be given an opportunity to opt out of the location information collection to protect privacy. In turn, the NFC mobile device may communicate the configuration to a location server, such as the servers 502, so that the location module (e.g., location module 520) on the server may be configured to not collect location information from the NFC mobile device. Further operations of the above techniques and the various modules of the servers 502 are additionally described below with respect to example processes shown in FIGS. 6-11.

Example Operations

FIGS. 6-11 present illustrative processes 600-1100 for obtaining a location of a NFC mobile device and using the location to perform various tasks. Each of the processes 600-1100 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-1100 are described with reference to the environment 100 of FIG. 1 and/or environment 300 of FIG. 3.

Figure 6:
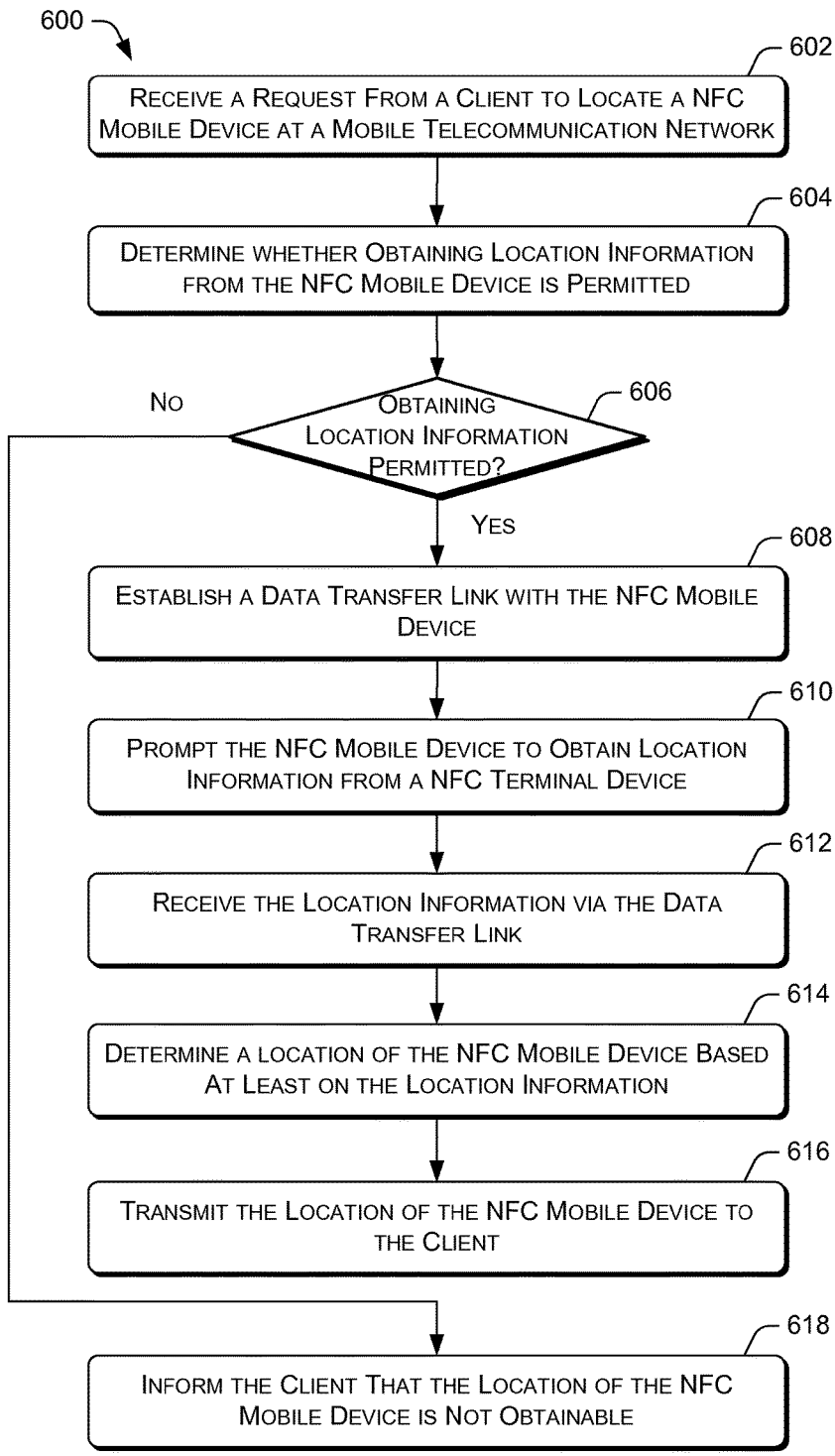
FIG. 6 shows a flow diagram of an example process for locating a NFC mobile device.

FIG. 6 shows a flow diagram of an example process 600 for locating a NFC mobile device. The NFC mobile device may be in an idle communication mode. At block 602, a mobile telecommunication network may receive a request from the client 124 to obtain location information on the NFC mobile device 112. The mobile telecommunication network may be the mobile telecommunication network 102 or the mobile telecommunication network 302.

At block 604, the network may determine whether obtaining location information from the NFC mobile device 112 is permitted. In various embodiments, privacy configuration on the NFC mobile device 112 may control whether information is to be provided to the network. However, such privacy configuration may be overridden by the network in certain circumstances, such when a law enforcement request with an appropriate court order is received by the network, or when a parent account holder requests the location of a child who is using the NFC mobile device 112.

Accordingly, if the network determines that it is permitted to obtain location information from the NFC mobile device ("yes" at decision block 606), the process 600 may proceed to block 608. At block 608, the network may establish a data transfer link with the NFC mobile device 112. The data transfer link may be a control plane positioning transfer link or a user plane positioning transfer link.

At block 610, the network may prompt the NFC mobile device 112 to obtain location information from a NFC terminal device, such as the NFC terminal device 114. In various embodiments, the NFC terminal device may be a terminal device that is communicating with the NFC mobile device 112 or a NFC terminal device that comes within communication range of the NFC mobile device 112.

At block 612, the network may receive the location information via the data transfer link. In various embodiments, the location information may include a NFC device identifier for the NFC terminal device and/or geographical address information for the NFC terminal device.

At block 614, the network may determine a location of the NFC mobile device 112 based at least on the location information. In some embodiments, the network may determine the location of the NFC mobile device 112 using the location information that the NFC mobile device 112 obtained from the NFC terminal device. For example, the network may use the NFC position database 532 to determine a location of the NFC terminal device based on the location information. Subsequently, the network may designate the location of the NFC terminal device as the location of the NFC mobile device 112. In other embodiments, the network may also use location information acquired using other positioning capabilities of the NFC mobile device 112 in conjunction with the location information to determine the location of the NFC mobile device.

At block 616, the network may transmit a location of the NFC mobile device to the client 124.

Returning to decision block 606, if the network determines that it is not permitted to obtain location information from the NFC mobile device ("no" at decision block 606), the process 600 may proceed to block 618. At block 618, the network may inform the client 124 that the location of the NFC mobile device 112 is not obtainable.

Figure 7:
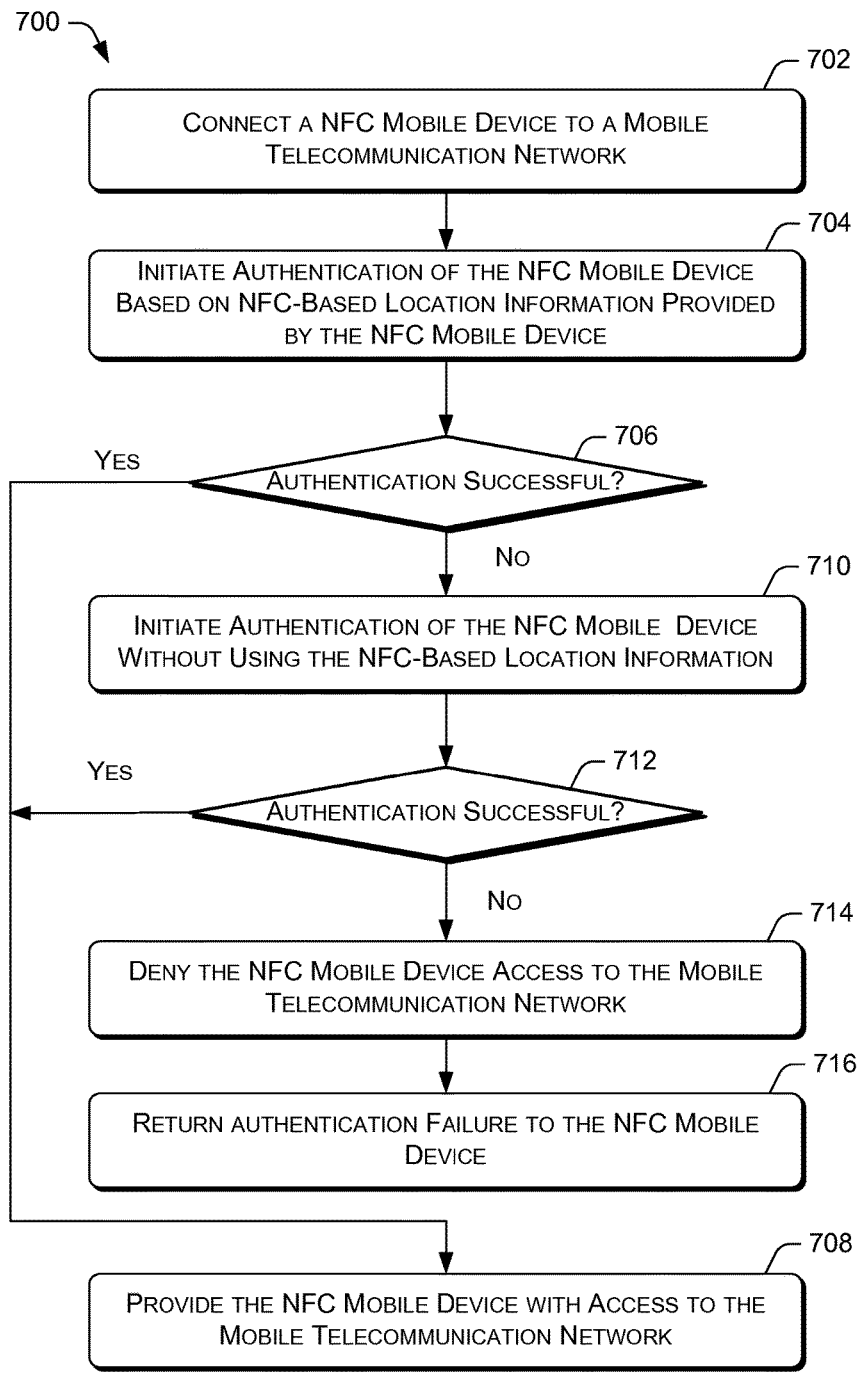
FIG. 7 shows a flow diagram of an example process for authenticating a NFC mobile device to a mobile telecommunication network based on NFC-based location information or other authentication information provided by the NFC mobile device.

FIG. 7 shows a flow diagram of an example process 700 for authenticating a NFC mobile device to a communication network based on NFC-based location information or other authentication information provided by the NFC mobile device. At block 702, the NFC mobile device 112 may connect to a mobile telecommunication network, such as the mobile telecommunication network 102 or the mobile telecommunication network 302. The NFC mobile device 112 may connect with the mobile telecommunication network to use the network to communicate with other communication devices that are on the network.

At block 704, the authentication module 522 on the servers 502 may initiate an authentication of the NFC mobile device 112 to the mobile telecommunication network based on NFC-based location information provided by the device. For example, the authentication module 422 on the servers 502 may command the NFC mobile device 112 to obtain location information from a NFC terminal device, such as the NFC terminal device 114. In various embodiments, the NFC terminal device may be a NFC terminal device that is communicating with the NFC mobile device 112 or a NFC terminal device that comes within communication range of the NFC mobile device 112. The location module 520 on the servers 502 may then compute a location of the mobile device 112 based on the location information obtained from the NFC terminal device.

At decision block 706, the servers 502 may determine whether the authentication of the NFC mobile device 112 to the mobile telecommunication network based on the NFC-based location information is successful. Thus, if the authentication module 522 on the servers 502 determines that the authentication based on the NFC-based location is successful ("yes" at decision 706), the process 700 may proceed to block 708. At block 708, the authentication module 522 may provide the NFC mobile device 112 with access to the mobile telecommunication network. Further, the location module 520 of the servers 502 may log the location of the NFC mobile device 112 and/or the location of the corresponding NFC terminal device into one or more databases (e.g., NFC position database 532) of the mobile telecommunication network.

However, if the authentication module 422 on the servers 502 determines that the authentication based on the NFC-based location is unsuccessful ("no" at decision 706), the process 700 may proceed to block 710. At block 710, the servers 502 may initiate an authentication of the NFC mobile device 112 to the mobile telecommunication network without using the NFC-based location information provided by the NFC mobile device 112. In some embodiments, the authentication module 522 on the servers 502 may perform such authentication by automatically retrieving and checking one or more embedded credentials of the NFC mobile devices. The credentials may include a device identifier of the NFC mobile device (e.g., an international mobile equipment identity (IMEI) number, an electronic serial number (ESN), a mobile equipment identifier (MEID), and/or so forth). In other embodiments, the authentication module 522 may authenticate the NFC mobile 112 by alternatively or concurrently prompting the user of the device to provide personal credentials (e.g., login name, password, etc.). In still other embodiments, the authentication module 522 may authenticate the NFC mobile device 112 base on a location of the device as provided by one or more other positioning components of the NFC mobile device 112 (e.g., A-GPS, Wi-Fi positioning component, and/or so forth).

At decision block 712, the servers 502 may determine whether the authentication of the NFC mobile device 112 to the mobile telecommunication network without using the NFC-based location is successful. Thus, if the authentication module 522 on the servers 502 determines that the authentication is successful ("yes" at decision block 712), the process 700 may once again proceed to block 708 to provide the NFC mobile device 112 with access to the mobile telecommunication network. However, if the authentication module 522 on the servers 502 determines that the authentication is unsuccessful ("no" at decision block 712), the process 700 may proceed to block 714. At block 714, the servers 502 may deny the NFC mobile device 112 access to the mobile telecommunication network. At block 716, the servers 502 may return an indication of an authentication failure to the NFC mobile device 112.

Figure 8:
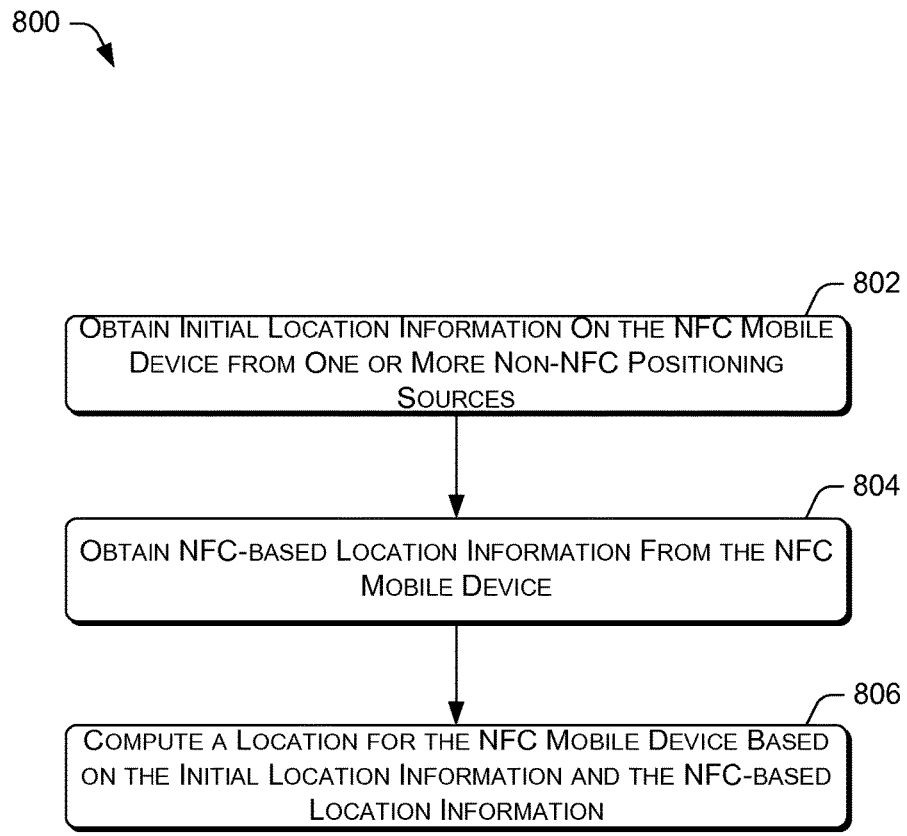
FIG. 8 shows a flow diagram of an example process for using a combination of NFC-based location information and one or more alternative sources of location information to locate a NFC mobile device.

FIG. 8 shows a flow diagram of an example process 800 for using a combination of NFC-based location information and one or more alternative sources of location information to locate a NFC mobile device. At block 802, at least one non-NFC position modules of the one or more servers 502 may obtain initial location information from the NFC mobile device 112. The non-NFC position modules may include a Wi-Fi position module 512, a cellular position module 514, and/or additional position modules 518.

At block 804, the NFC position module 516 of the servers 502 may obtain NFC-based location information from the NFC mobile device 112. In various embodiments, the NFC-based location information may be obtained by the NFC mobile device 112 from a NFC terminal device that is communicating with the NFC mobile device 112, such as the NFC terminal device 114.

At block 806, the location module 520 of the servers 502 may compute a location of the NFC mobile device 112 based on the initial location information and the NFC-based location information. In some embodiments, the computation may include cross referencing the initial location information with the NFC-based location information to obtain the location of the NFC mobile device 112. In other embodiments, the computation may include using the initial location information to speed up the determination of the location using the NFC-based location information, or using the NFC-based location information to facilitate obtaining the location based on the initial location information.

Figure 9:
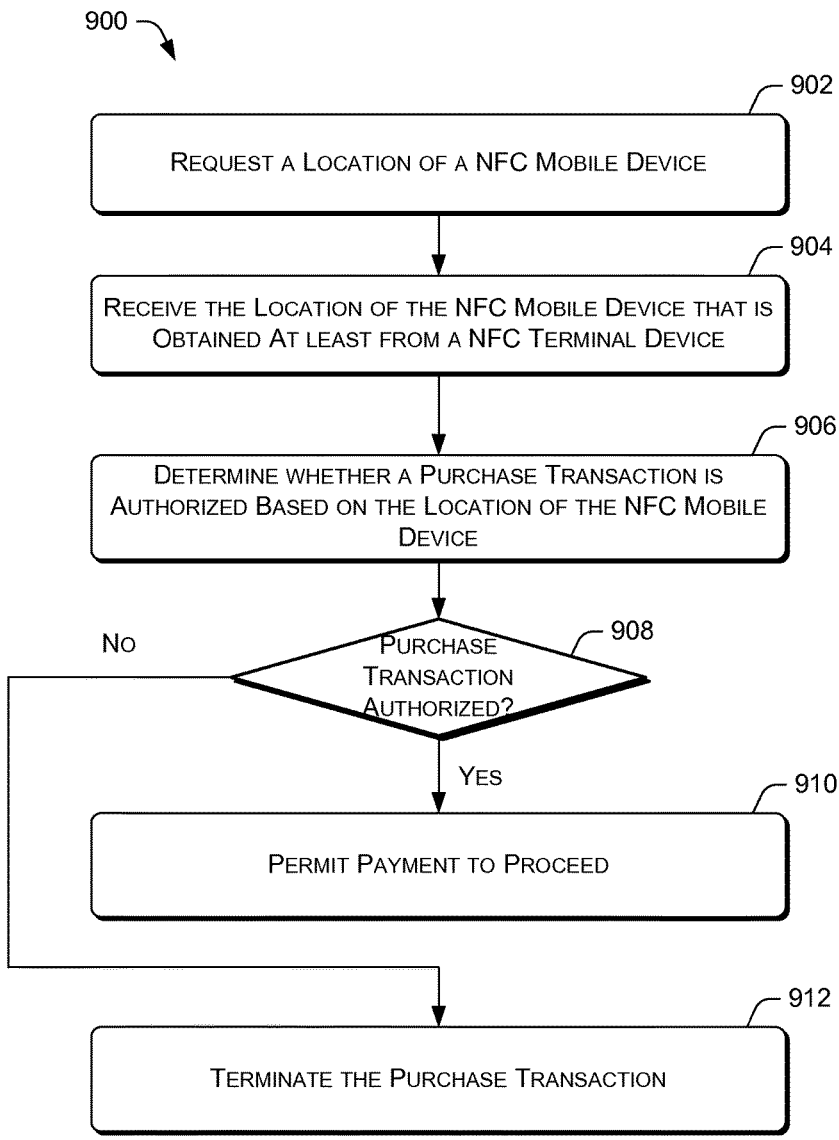
FIG. 9 shows a flow diagram of an example process for determining whether a purchase transaction is authorized based on NFC-based location information reported by a NFC mobile device.

FIG. 9 shows a flow diagram of an example process 900 for determining whether a purchase transaction is authorized based on NFC-based location information reported by a NFC mobile device. At block 902, the client 124 may request a location of the NFC mobile device 112. In at least one embodiment, the client 124 may be a payment processor that processes purchase transactions (e.g., credit card purchase transactions).

At block 904, the client 124 may receive the location of the NFC mobile device 112 from a mobile telecommunication network. The location of the NFC mobile device 112 may have been obtained from a NFC terminal device (e.g., NFC terminal device 114) that is communicating with the NFC mobile device 112. In some embodiments, the location of the NFC mobile device 112 may have also been determined using location information obtained from one or more non-NFC positioning sources (e.g., Wi-Fi positioning, cellular triangulation, etc.) The NFC terminal device may be engaged in interacting with the NFC mobile device 112 to facilitate the transaction via an electronic wallet application.

At block 906, the client 124 may determine whether the purchase transaction is authorized based on the location of the NFC mobile device 112. In at least one embodiment, the client 124 may authorize the purchase transaction when the location is within a predefined geographical area. For example, the NFC mobile device 112 may belong to a student whose parent indicated to the payment processor that the student is only permitted to use the NFC mobile device 112 to purchase items from stores on a university campus.

Accordingly, at decision block 908, if the client 124 determines that the purchase transaction is authorized ("yes" at decision block 908), the process 900 may proceed to block 910. At block 910, the client 124 may permit the payment using the electronic wallet application to proceed so that a purchase can be completed. However, if the client 124 determines that the purchase transaction is not authorized ("no" at decision block 908), the process 900 may proceed to block 912. At block 912, the client 124 may terminate the purchase transaction.

Figure 10:
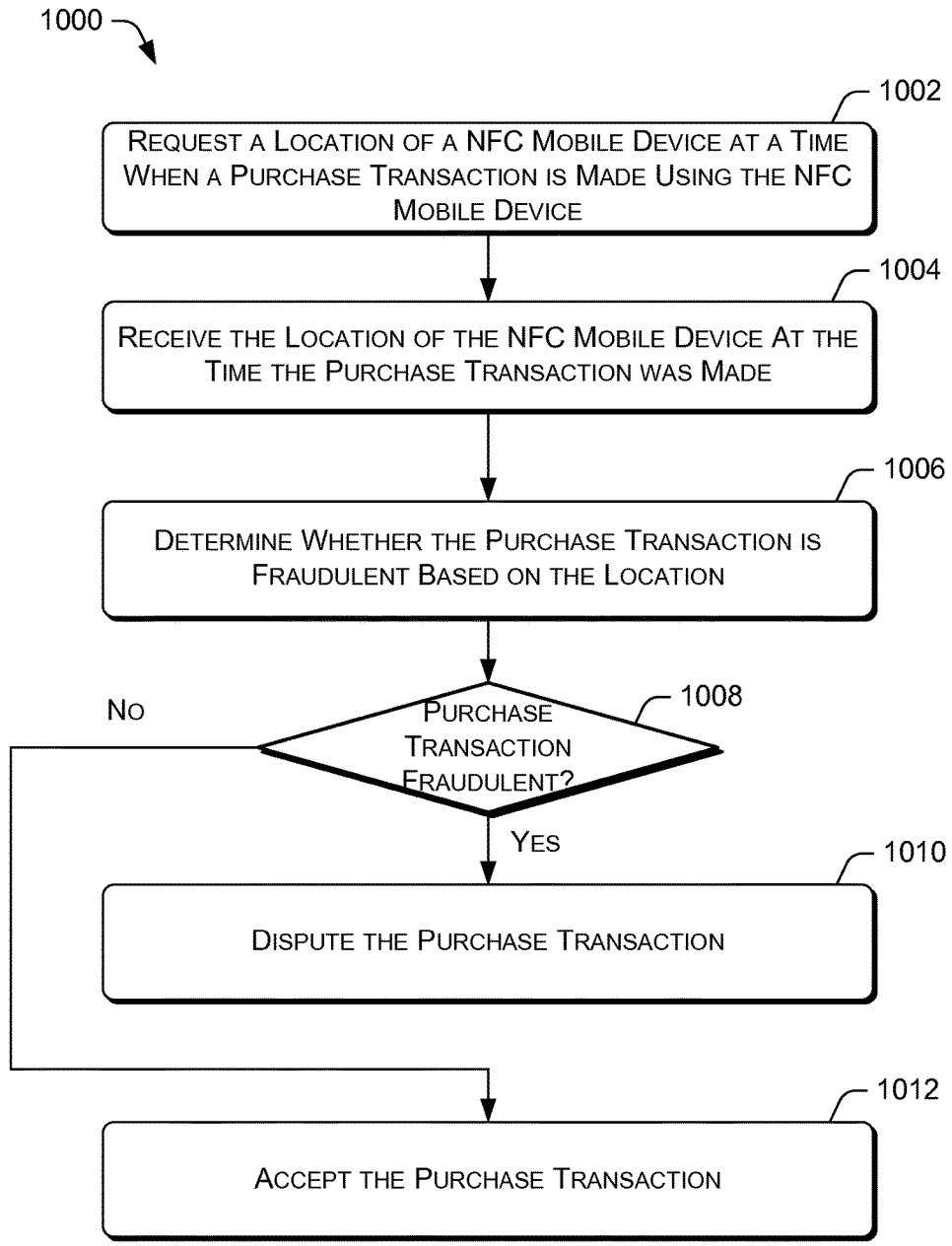
FIG. 10 shows a flow diagram of an example process for determining whether a purchase transaction is fraudulent based on NFC-based location information reported by a NFC mobile device.

FIG. 10 shows a flow diagram of an example process 1000 for determining whether a purchase transaction is fraudulent based on NFC-based location information reported by a NFC mobile device. At block 1002, the client 124 may request a location of the NFC mobile device 112 at a time when a purchase transaction was made via the NFC mobile device 112. In at least one embodiment, the client 124 may be customer who has used an electronic wallet application on the NFC mobile device 112 to pay for purchase transactions. The request may be pass by a mobile telecommunication network to a payment processor. The mobile telecommunication network may be the mobile telecommunication network 102 or the mobile telecommunication network 302

At block 1004, an application (e.g., electronic wallet application) on the NFC mobile device 112 may receive the location of the NFC mobile device 112 at the time the purchase transaction was made from a server. The server may be a server of the payment processor that tracks the locations of NFC terminal devices that interacted with the NFC mobile device 112 as the NFC mobile device 112 is used by customer to pay for various purchase transactions. In at least one embodiment, the application on the NFC mobile device 112 may present the location on a map, present a geographical address that corresponds to the location, a business name that corresponds to the location, and/or the like. The presentation may also include other information, such as the date of the purchase transaction, the amount of the purchase transaction, the product or service that was purchased through the purchase transaction, and/or so forth.

At decision block 1008, the customer may view the location of the NFC mobile device at the time of the purchase transaction as presented by the application. Based on the location, the customer may determine whether the purchase transaction is fraudulent. For example, the customer may decide that the purchase transaction is illegitimate when it occurred at a location the customer did not visit on the day the purchase transaction occurred.

Thus, if the customer determines that the purchase transaction is fraudulent ("yes" at decision block 1008), the process 1000 may proceed to block 1010. At block 1010, the customer may dispute the purchase transaction. In at least one embodiment, the customer may initiate the dispute using a dispute option of the application.

However, if the customer determines that the purchase transaction is not fraudulent ("no" at decision block 1008), the process may proceed to block 1012. At block 1012, the customer may accept the purchase transaction. In at least one embodiment, the customer may accept the purchase transaction using an accept option of the application.

Figure 11:
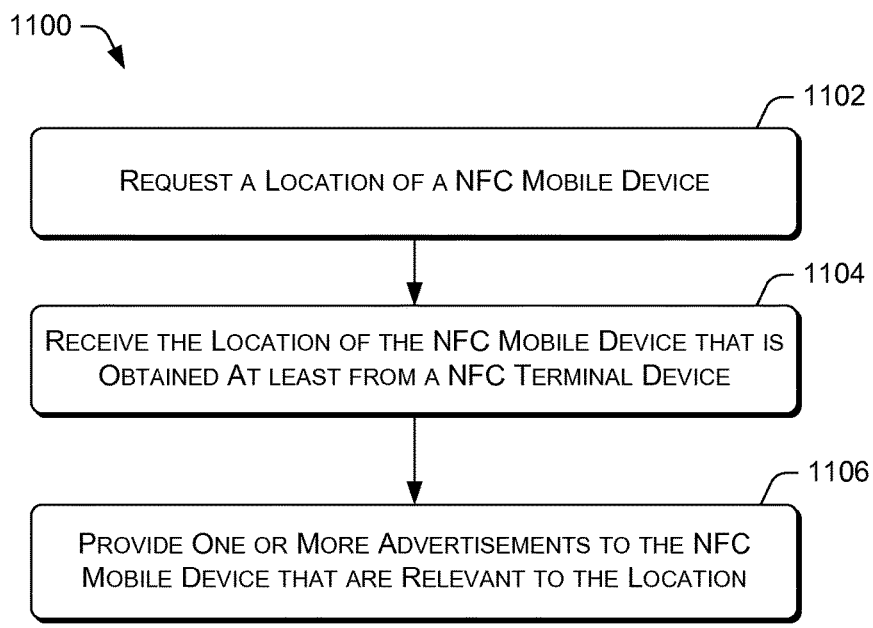
FIG. 11 shows a flow diagram of an example process 1100 for providing advertisements based on NFC-based location information reported by a NFC mobile device.

FIG. 11 shows a flow diagram of an example process 1100 for providing advertisements based on NFC-based location information reported by a NFC mobile device. At block 1102, the client 124 may request a location of the NFC mobile device 112. In at least one embodiment, the client 124 may be an advertiser, and the user of the NFC mobile device 112 may have agreed to receive electronic advertisements (e.g., email advertisements, text advertisements, etc.) from the advertiser.

At block 1104, the client 124 may receive the location of the NFC mobile device 112 from a mobile telecommunication network. In some embodiments, the location of the NFC mobile device 112 may have been obtained from a NFC terminal device (e.g., NFC terminal device 114) that is communicating with the NFC mobile device 112. The NFC terminal device may be engaged in interaction with the NFC mobile device 112 to facilitate the transaction via an electronic wallet application. In other embodiments, the location of the NFC mobile device 112 may have also been determined using location information obtained from one or more non-NFC positioning sources (e.g., Wi-Fi positioning, cellular triangulation, etc.), independently or in conjunction with the NFC-based location information.

At block 1106, the client 124 may provide advertisements to the NFC mobile device 112. In various embodiments, the advertisements may be relevant to the location of the NFC mobile device 112. For example, when the client 124 determines that the NFC mobile device 112 is located at or near a shopping mall, the client 124 may send one or more electronic advertisements for the stores in the shopping mall to the NFC mobile device 112. In exchange, the client 124 may pay a fee for receiving the location of the NFC mobile device 112.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A computer-implemented method, comprising:
   establishing a data transfer link with a near field communication (NFC) mobile device using a mobile telecommunication network;
   prompting the NFC mobile device to obtain location information from a first NFC terminal device that is communicating with the NFC mobile device;
   receiving the location information from the NFC mobile device via the data transfer link;
   obtaining additional location information indicative of a location of the NFC mobile device using one or more additional positioning components of the NFC mobile device; and
   determining the location of the NFC mobile device based at least on the location information received from the NFC mobile device, wherein the location information is used to obtain a terminal location of the first NFC terminal device from a database and the terminal location is utilized in determining the location of the NFC mobile device, wherein the determining includes:
   searching the database at a first speed using the location information;
   eliminating one or more location data entries from the database that correlates NFC device identifiers to locations based at least on the additional location information as obtained by the one or more additional positioning components, wherein the eliminating results in a list of remaining location data entries;
   determining that a NFC device identifier matches the first NFC terminal device and a second NFC terminal device;
   searching the database at a second speed using the additional location information, the second speed being greater than the first speed;
   correlating the NFC device identifier included in the location information with a remaining location data entry from the list of remaining location data entries in the database to obtain a terminal location of the first NFC terminal device;
   designating the terminal location as the location of the NFC mobile device;
   transmitting the location of the NFC mobile device to a client, the location including an indication that a purchase transaction is legitimate.

2. The computer-implemented method of claim 1, further comprising:
   receiving a request from the client at the mobile telecommunication network to locate the NFC mobile device and transmitting the location of the NFC mobile device to the client in response to receiving the request.

3. The computer-implemented method of claim 2, wherein the client determines that the purchase transaction is legitimate when the client correlates the location with the purchase transaction, and determines that the transaction is fraudulent when the client is unable to correlate the transaction with the purchase transaction.

4. The computer-implemented method of claim 1, further comprising combining the location information with the additional location information to determine the location of the first NFC terminal device.

5. The computer-implemented method of claim 1, wherein the determining includes: obtaining the terminal location of the first NFC terminal device from the database using a NFC device identifier of the first NFC terminal device in the location information; cross referencing the terminal location with additional location information; and designating the terminal location as the location of the NFC mobile device when the terminal location is within a predetermined range of an additional location indicated by the additional location information.

6. The computer-implemented method of claim 5, wherein the additional location information is obtained from a Wi-Fi device, a Bluetooth device, an ultra mobile broadband (UMB) device that is communicating with the NFC mobile device, a global position system (GPS)-component of the NFC mobile device, an A-GPS component of the NFC mobile device, or a cellular positioning of the NFC mobile device by the mobile telecommunication network.

7. The computer-implemented method of claim 5, wherein the cross referencing includes cross referencing the terminal location when a database entry holding the terminal location in the database is unmodified for a predetermined amount of time.

8. The computer-implemented method of claim 1, further comprising updating a database entry in the database that provided the terminal location with the additional location information when the terminal location is outside of a predetermined range of the additional location information.

9. The computer-implemented method of claim 1, the operations further comprise
designating the terminal location as the location of the first NFC terminal device based at least on the additional location information.

10. The computer-implemented method of claim 9, wherein the first NFC terminal device is associated with a first location and the second NFC terminal device is associated with a second location that is different than the first location.

11. The computer-implemented method of claim 1, wherein searching the database at the first speed includes searching a first list of location data entries from the database and searching the database at the second speed includes searching a second list of location data entries having less location data entries than the first list.

12. A non-transitory computer-readable medium in a switch storing computer-executable instructions that, when executed, cause one or more processors to perform acts comprising:
receiving a request from a client to locate a near field communication (NFC) mobile device;
prompting the NFC mobile device to obtain location information on a first NFC terminal device that is communicating with the NFC mobile device;
receiving the location information on the first NFC terminal device from the NFC mobile device;
obtaining additional location information indicative of a location of the NFC mobile device using one or more additional positioning components of the NFC mobile device;
determining the location of the NFC mobile device based at least on the location information received from the NFC mobile device, wherein the location information is used to obtain a terminal location of the first NFC terminal device from a database and the terminal location is utilized in determining the location of the NFC mobile device, wherein the determining includes:
searching the database at a first speed using the location information;
eliminating one or more location data entries from the database that correlates NFC device identifiers to locations based at least on the additional location information as obtained by the one or more additional positioning components, wherein the eliminating results in a list of remaining location data entries;
determining that a NFC device identifier matches the first NFC terminal device and a second NFC terminal device;
searching the database at a second speed using the additional location information, the second speed being greater than the first speed;
correlating the NFC device identifier included in the location information with a remaining location data entry from the list of remaining location data entries in the database to obtain a terminal location of the first NFC terminal device;
designating the terminal location as the location of the NFC mobile device; and
transmitting the location of the NFC mobile device as determined from the location information to the client, the location including an indication that a purchase transaction is legitimate.

13. The non-transitory computer-readable medium of claim 12, wherein the location information includes at least one of a geographical address, a NFC device identifier that corresponds to the geographical address, a name of a business that hosts the first NFC terminal device, or geographical coordinates that correspond to the first NFC terminal device.

14. The non-transitory computer-readable medium of claim 12, wherein the determining includes:
obtaining a terminal location of the first NFC terminal device from a database using the NFC device identifier of the first NFC terminal device in the location information;
combining the terminal location with the additional location information; and
designating a result of the combining of the terminal location with the additional location information as the location of the NFC mobile device.

15. The non-transitory computer-readable medium of claim 12, further comprising storing a new data entry that correlates a new NFC device identifier of a new NFC terminal device with a new terminal location into the database following the NFC mobile device encountering the new NFC terminal device.

16. The non-transitory computer-readable medium of claim 15, wherein the new terminal location is obtained from a global position system (GPS)-component of the NFC mobile device, an A-GPS component of the NFC mobile, a cellular positioning of the NFC mobile by a mobile telecommunication network, or the new NFC terminal device.

17. The non-transitory computer-readable medium of claim 12, wherein the client authorizes the purchase transaction initiated by the NFC mobile device and received by the first NFC terminal device when the location of the NFC mobile device is within a predetermined geographical area.

18. A mobile telecommunication network, comprising:
one or more processors; and
a memory that includes a plurality of computer-executable components, the plurality of computer-executable components comprising:
 a near field communication (NFC) position component that prompts a NFC mobile device to obtain location information from a first NFC terminal device that is communicating with the NFC mobile device;
 one or more additional positioning components of the NFC mobile device that obtain additional location information indicative of a location of the NFC mobile device;
 a location component that determines the location of the NFC mobile device based at least on the location information received from the NFC mobile device, wherein the location information is used to obtain a terminal location of the first NFC terminal device from a database and the terminal location is utilized in determining the location of the NFC mobile device, wherein the determining includes:
  searching the database at a first speed using the location information;
  eliminating one or more location data entries from the database that correlates NFC device identifiers to locations based at least on the additional location information as obtained by the one or more additional positioning components, wherein the eliminating results in a list of remaining location data entries;
  determining that a NFC device identifier matches the first NFC terminal device and a second NFC terminal device;
  searching the database at a second speed using the additional location information, the second speed being greater than the first speed;
  correlating the NFC device identifier included in the location information with a remaining location data entry from the list of remaining location data entries in the database to obtain a terminal location of the first NFC terminal device; and
  designating the terminal location as the location of the NFC mobile device; and
 a client interface component that receives a request for the location of the NFC mobile device from a client and transmits the location of the NFC mobile device as determined from the location information to the client in exchange for a fee, the location including an indication that a purchase transaction is legitimate.

19. The mobile telecommunication network of claim 18, wherein the additional positioning components include at least one of:
 a Wi-Fi position component that obtains additional location information on the NFC mobile device based on an identifier of a wireless access point that is communicating with the NFC mobile device;
 a cellular position module that obtains additional location information on the NFC mobile device by analyzing signals between the NFC mobile device and one or more base stations;
 a global positioning system (GPS) position component that obtains additional location information from a GPS component or an A-GPS component of the NFC mobile device.

20. The mobile telecommunication network of claim 18, further comprising an authentication module that authenticates the NFC mobile device to the mobile telecommunication network based at least on the location information.

\* \* \* \* \*